US009245041B2

(12) United States Patent
Pilskalns et al.

(10) Patent No.: US 9,245,041 B2
(45) Date of Patent: Jan. 26, 2016

(54) CREATION AND USE OF DIGITAL MAPS

(75) Inventors: Orest Pilskalns, Missoula, MT (US);
Kevin Karpenske, Vancouver, WA (US);
Adam McDonald, Longview, WA (US);
Jacob Moore, Kalama, WA (US)

(73) Assignee: GeoMonkey, Inc., Vancover, WA (US)

( * ) Notice: Subject to any disclaimer, the term of this patent is extended or adjusted under 35 U.S.C. 154(b) by 483 days.

(21) Appl. No.: 12/267,604

(22) Filed: Nov. 9, 2008

(65) Prior Publication Data
US 2009/0132941 A1 May 21, 2009

Related U.S. Application Data

(60) Provisional application No. 60/987,036, filed on Nov. 10, 2007, provisional application No. 61/044,860, filed on Apr. 14, 2008.

(51) Int. Cl.
G06F 3/048 (2013.01)
G06F 17/30 (2006.01)

(52) U.S. Cl.
CPC ...... G06F 17/3087 (2013.01); *G06F 17/30241* (2013.01)

(58) Field of Classification Search
CPC ............................ G06F 3/048; G06F 17/30241
USPC ......................................................... 715/764
See application file for complete search history.

(56) References Cited

U.S. PATENT DOCUMENTS 7,388,519 B1 * 6/2008 Kreft ........................ 340/995.24
7,475,060 B2 * 1/2009 Toyama et al.
7,720,844 B2 * 5/2010 Chu et al. ....................... 707/724
7,730,389 B2 * 6/2010 Rasmussen et al. ........... 715/208
7,739,038 B2 * 6/2010 Coch et al. ..................... 701/468
7,748,021 B2 * 6/2010 Obradovich ................... 725/105
7,792,870 B2 * 9/2010 Field et al. ..................... 707/802
7,840,224 B2 * 11/2010 Vengroff et al. ............ 455/456.1
7,904,241 B2 * 3/2011 Coch et al. ..................... 701/431
7,945,852 B1 * 5/2011 Pilskalns ........................ 715/230
8,015,183 B2 * 9/2011 Frank ............................. 707/724

(Continued)

OTHER PUBLICATIONS

U.S. Appl. No. 13/172,706, filed Jun. 29, 2011 (not yet published).

*Primary Examiner* — William Titcomb
(74) *Attorney, Agent, or Firm* — Lee & Hayes, PLLC

(57) ABSTRACT

Techniques described herein allow a user to automatically associate an object with a location of the user and/or the object. This object and associated location may then be transferred to an entity for publishing the object and location on a map. For example, a user may capture a digital picture or video on a device and, in response, may automatically transmit the picture or video and corresponding location data for publishing to a map that is associated with the user. The described techniques also allow a user to create a journal that is associated with an annotated map. For instance, the user may create a journal having one or more portions that are associated with one or more portions of an annotated map. As a user consumes (e.g., reads, views, listens, etc.) the created journal, the view of the map or the displayed annotations may correspondingly change. Finally, the described techniques allow for creation of multiple overlays on a digital map. That is, these tools may allow each of multiple users to create an overlay, comprising one or more annotations, onto a digital map. These tools may then allow consuming users to choose whether to view all, some, or none of these user-created overlays.

11 Claims, 16 Drawing Sheets

(56) References Cited

U.S. PATENT DOCUMENTS

| | | | |
|---|---|---|---|
| 8,078,398 B2* | 12/2011 | Coch et al. | 701/420 |
| 8,280,625 B2* | 10/2012 | Coch et al. | 701/409 |
| 8,369,867 B2* | 2/2013 | Van Os et al. | 455/456.1 |
| 8,397,177 B2* | 3/2013 | Barros | 715/810 |
| 8,843,309 B2* | 9/2014 | Kimchi et al. | 701/436 |
| 2003/0182052 A1* | 9/2003 | DeLorme et al. | 701/201 |
| 2004/0230371 A1* | 11/2004 | Vincent et al. | 701/200 |
| 2005/0052462 A1* | 3/2005 | Sakamoto et al. | 345/473 |
| 2005/0075097 A1* | 4/2005 | Lehikoinen et al. | 455/414.1 |
| 2006/0136127 A1* | 6/2006 | Coch et al. | 701/208 |
| 2007/0038960 A1* | 2/2007 | Rekimoto | 715/848 |
| 2007/0073562 A1* | 3/2007 | Brice et al. | 705/5 |
| 2007/0132767 A1* | 6/2007 | Wright et al. | 345/475 |
| 2007/0218900 A1* | 9/2007 | Abhyanker | 455/435.1 |
| 2007/0233367 A1* | 10/2007 | Chen et al. | 701/207 |
| 2007/0233582 A1* | 10/2007 | Abhyanker | 705/28 |
| 2007/0288164 A1* | 12/2007 | Gordon et al. | 701/213 |
| 2008/0010605 A1* | 1/2008 | Frank | 715/765 |
| 2008/0040684 A1* | 2/2008 | Crump | 715/808 |
| 2008/0092061 A1* | 4/2008 | Bankston et al. | 715/748 |
| 2008/0109761 A1* | 5/2008 | Stambaugh | 715/853 |
| 2008/0132251 A1* | 6/2008 | Altman et al. | 455/457 |
| 2008/0132252 A1* | 6/2008 | Altman et al. | 455/457 |
| 2008/0172288 A1* | 7/2008 | Pilskalns et al. | 705/10 |
| 2008/0172632 A1* | 7/2008 | Stambaugh | 715/781 |
| 2008/0235582 A1* | 9/2008 | Zalewski et al. | 715/716 |
| 2008/0281848 A1* | 11/2008 | Corbett | 707/101 |
| 2009/0005981 A1* | 1/2009 | Forstall et al. | 701/211 |
| 2009/0012955 A1* | 1/2009 | Chu et al. | 707/5 |
| 2009/0055725 A1* | 2/2009 | Portnov et al. | 715/234 |
| 2010/0075697 A1 | 3/2010 | Gupta | |
| 2010/0231751 A1* | 9/2010 | Obradovich | 348/231.3 |
| 2010/0256902 A1* | 10/2010 | Coch et al. | 701/208 |
| 2011/0218732 A1* | 9/2011 | Coch et al. | 701/208 |
| 2012/0150443 A1* | 6/2012 | Coch et al. | 701/532 |
| 2012/0324378 A1* | 12/2012 | Stambaugh | 715/764 |
| 2013/0046829 A1* | 2/2013 | Coch et al. | 709/204 |
| 2013/0311910 A1* | 11/2013 | Stambaugh | 715/760 |

* cited by examiner

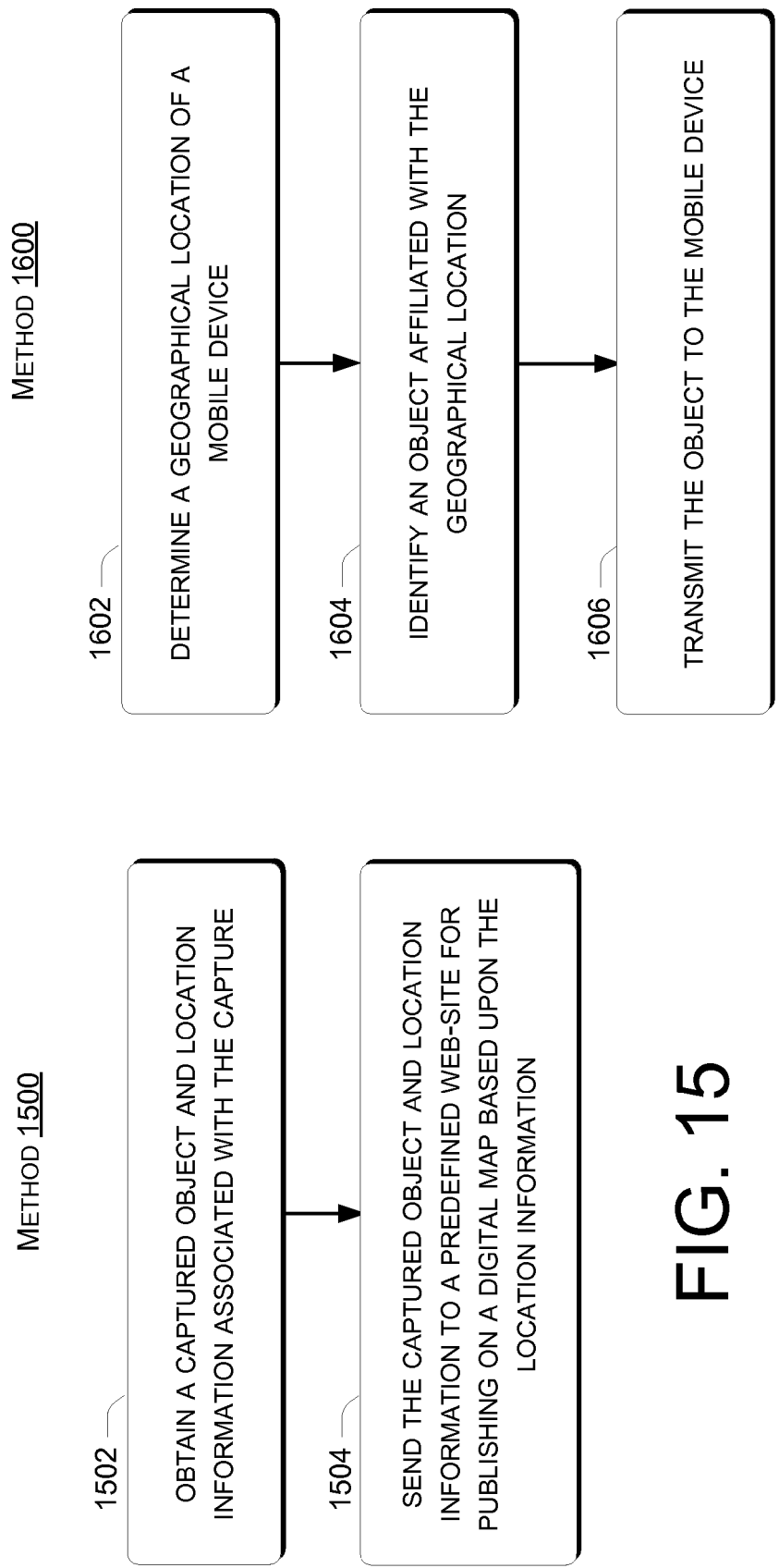

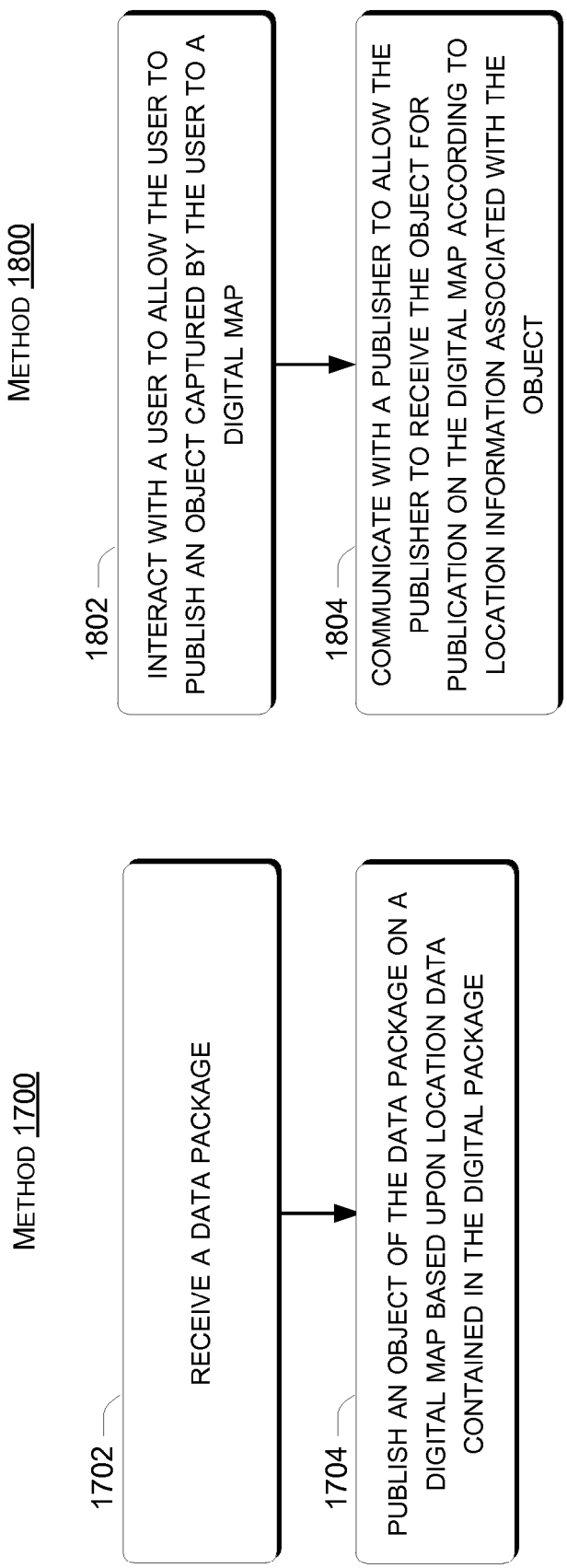

CREATION AND USE OF DIGITAL MAPS

PRIORITY

This patent application claims priority from U.S. Provisional Application No. 60/987,036, filed on Nov. 10, 2007 and from U.S. Provisional Application No. 61/044,860, filed on Apr. 14, 2008.

BACKGROUND

Numerous tools exist for electronically presenting geographic information to users. The geographic information conventionally provides a map that shows locations of roadways, population centers, natural landscape features, and so forth. The geographic information may also overlay other information "on top" of the map that pertains to a particular subject. To cite merely one example, geographic information may overlay historical-based rainfall data on a map of a particular region to convey how rainfall is distributed across the region.

There remains room for improvement in the above-described technology for presenting geographic information.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

FIG. 1 depicts an illustrative architecture in which a user may, for example, capture a digital picture or video on a device and, in response, automatically transmit the picture or video and corresponding location data for publishing to a map. Here, the user takes a picture of a house and the picture is automatically associated with a location at which the picture was taken, and is published to a map that the user manages or is otherwise associated with.

FIG. 2 depicts an illustrative user interface (UI) produced by the system of FIG. 1. Here, the UI includes a map that has been annotated with locations of houses, including the house illustrated by FIG. 1.

FIG. 3 continues the illustration of FIG. 2 after a viewing user has selected, from the map, the house of FIG. 1. In response to the selection, the UI renders the picture of the house, as taken by the user of FIG. 1.

FIG. 4 depicts an illustrative UI that includes a journal on a left side of the UI and a map on the right side. Here, the journal may be associated with the map such that the illustrated map changes as a viewing user reads through the illustrated journal.

FIG. 5 depicts the illustrative UI from FIG. 4 as the viewing user scrolls through the illustrated journal. Here, the user has reached a portion of the journal that includes a reference to a particular house illustrated on the map. In response, the UI displays a picture of the house.

FIG. 6 depicts the illustrative UI from FIGS. 4 and 5 as the viewing user continues to scroll through the illustrated journal. Here, the user has reached a portion of the journal that includes a reference to a second house illustrated on the map. In response, the UI displays a picture of the second house.

FIG. 7 depicts the illustrative UI from FIGS. 4-6 as the viewing user continues to scroll through the illustrated journal. Here, the user has reached a portion of the journal that includes a reference to a third illustrated house (the house illustrated in FIGS. 1 and 3). In response, the UI displays a picture of this third house.

FIG. 8 depicts another illustrative UI that includes multiple overlays on an illustrated map. Here, each of multiple users is associated with an overlay, which comprises annotations on the map. This UI allows a viewing user to select which overlays to view on the map and which to hide. Here, by selection of the user or by default, the map illustrates each of the overlays.

FIGS. 15-18 are flow charts that convey publication methods in accordance with some implementations.

DETAILED DESCRIPTION

Figure 1:
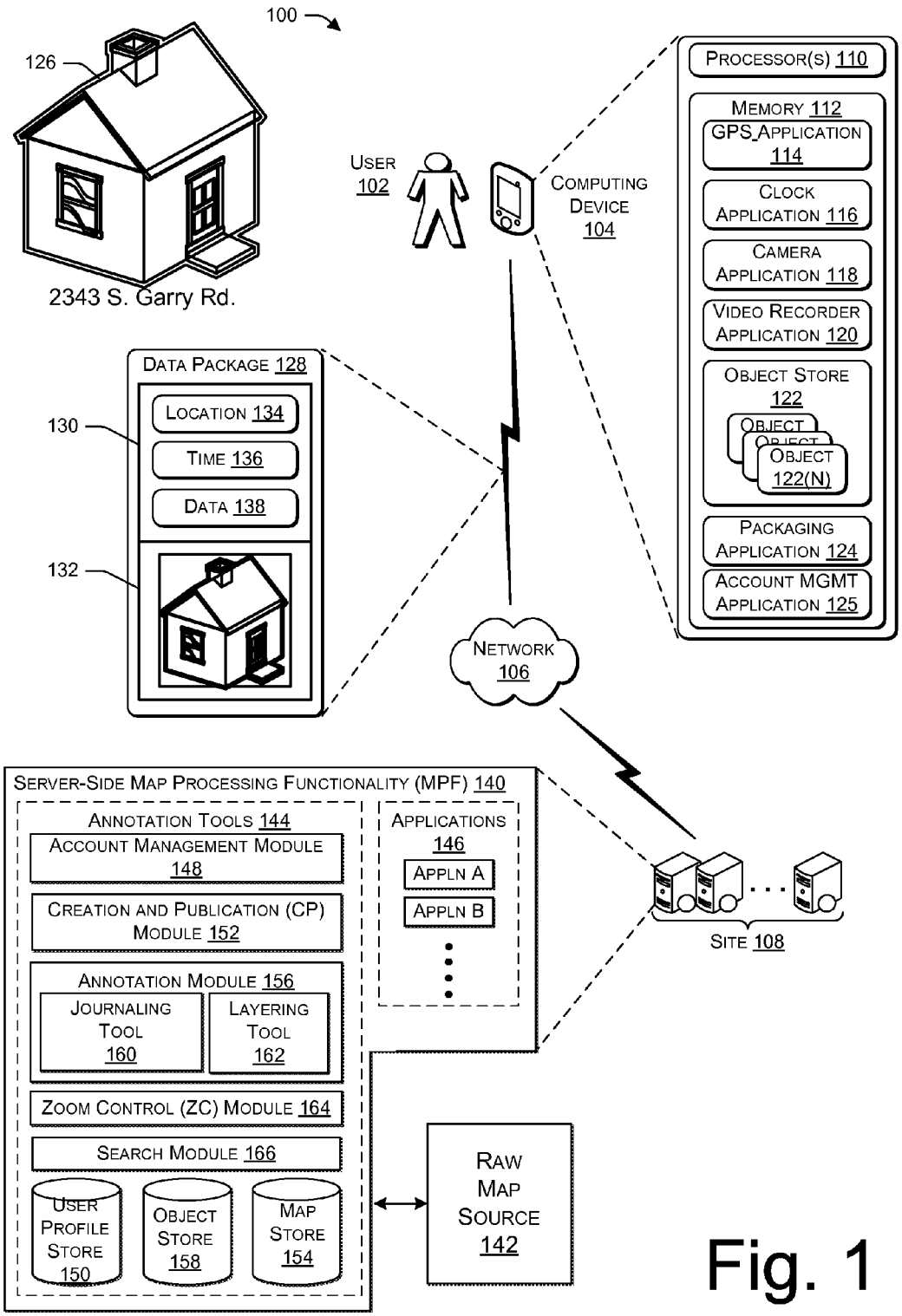

This document describes tools for allowing a user to automatically associate an object with a location of the user and/or the object. This object and associated location may then be transferred to an entity for publishing the object at the associated location on a map. For example, a user may capture a digital photograph or video on a device and, in response, may automatically transmit the picture or video and corresponding location data for publishing to a map that is associated with the user or that is associated with one or more other users.

This document also describes tools for allowing a user to create a journal that is associated with an annotated map. For instance, the user may create a journal having one or more portions that are associated with one or more portions of an annotated map. As a user consumes (e.g., reads, views, listens, etc.) the created journal, the view of the map or the displayed annotations may correspondingly change.

For instance, a user may create an electronic journal that describes a mountain hike that the user recently completed. The user may also annotate a digital map with digital photographs taken during the hike. Furthermore, the user may associate portions of the journal with corresponding pictures. Therefore, as a consuming user reads the journal, corresponding pictures may be displayed. With this association, the reading user may not only read a journal about the hike, but may also view pictures that change according to the consuming user's location in the journal.

Finally, this document describes tools for allowing creation of multiple overlays on a digital map. That is, these tools may allow each of multiple users to create an overlay, comprising one or more annotations, onto the same digital map. These tools may then allow consuming users to choose whether to view all, some, or none of these user-created overlays.

For instance, in the hiking example discussed immediately above, envision that three users have hiked the same trail and each has included an overlay detailing his or her hike on a same digital map. A user that is viewing this map may decide whether to view zero, one, two, or three of these created overlays. The viewing user may also decide to view each one individually, to view two at a time, or to view none or more of these overlays in any other manner.

The discussion begins with a section entitled "Illustrative Architecture", which describes one non-limiting environment that may implement the claimed tools. A section entitled "Illustrative User Interfaces (UIs)" follows. This section illustrates and describes illustrative UIs that may include objects that have been automatically associated with a location. This section also includes UIs that comprise a journal that is associated with one or more portions of an annotated digital map. This section also illustrates UIs that allow a user to view none or more of multiple overlays associated with a digital map.

This brief introduction, including section titles and corresponding summaries, is provided for the reader's convenience and is not intended to limit the scope of the claims, nor the proceeding sections. The term "tools," for instance, may refer to system(s), method(s), computer-readable instructions, and/or technique(s) as permitted by the context above and throughout the document.

Illustrative Architecture

FIG. 1 depicts an illustrative architecture 100 in which a user may, for example, capture a digital picture or video on a device and, in response, automatically transmit the picture or video and corresponding location data for publishing to a map. Architecture 100 of FIG. 1 may also enable the journaling and overlaying techniques, described in detail below.

As illustrated, FIG. 1 includes a user 102 operating a computing device 104 for the purpose of capturing an object (e.g., a picture, video, media file, audio, text, or a combination thereof, etc.), associating the object with a location, and transmitting the object and associated location over a network 106. This object may then be published on a map maintained by a site 108. Computing device 104 may comprise any sort of device capable of capturing an object, such as a picture or video. For instance, device 104 may be a mobile phone, a personal digital assistant (PDA), a laptop computer, a portable media player (PMP) (e.g., a portable video player (PVP), a digital audio player (DAP), etc.), or any other computing device. Here, computing device 104 comprises a mobile or cellular phone of user 102. Furthermore, note that in other instances, computing device 104 may comprise a wirelessly-enabled camera or video recorder. The above described features tend to make computing device 104 readily portable. Accordingly, these types of computing device are often called "portable devices" or "mobile devices".

Meanwhile, network 106, which couples computing device 104 and site 108, may comprise the Internet, a Local Area Network (LAN), a Wide Area Network (WAN), a wireless network, and/or the like. Here, network 106 may comprise a wireless cellular network or a wireless fidelity (Wi-Fi) network.

As illustrated, computing device 104 includes one or more processors 110, as well as memory 112. Memory 112 includes a global positioning system (GPS) application 114, a clock application 116, a camera application 118, a video recorder application 120, an object store 122 storing one or more objects 122(1), (2), . . . , (N), and a packaging application 124. As discussed in detail below, these components are merely illustrative, and computing device 104 may include more or less components in other implementations. Furthermore, while FIG. 1 illustrates software modules, it is noted that device 104 may include corresponding hardware to help accomplish a given module's task. For instance, device 104 may include camera hardware that, when coupled with camera application 118, allows user to take photographs using the device.

GPS application 114 functions to determine a current location of computing device 104 via any known location-tracking technique or otherwise. GPS application 114 may continually track a location of user 102 or may periodically track this location. GPS application 114 may then store these tracked locations (locally on computing device 104 or remotely) such that computing device 104 may access this location data. Furthermore, GPS application 114 may determine a location when a user 102 (and/or computing device) engages in a predetermined activity. For instance, GPS application 114 may determine a location of computing device 104 when device 104 captures an object (e.g., a photograph, a video recording, a document, etc.), as discussed in detail below.

Clock application 116, meanwhile, functions to maintain a current time. The clock application may determine and maintain this time locally or, in the case of some mobile phones, may determine the current time over the cellular or Wi-Fi network. However it is determined, clock application 116 may determine and store certain times associated with certain user and/or device actions. For instance, and similar to that discussed above with regards to GPS application 114, clock application 116 may determine and store a time when device 104 captures an object.

Next, device 104 includes camera application 118. As discussed above, camera application 118 allows user 102 to capture and store (e.g., locally or remotely) one or more photographs. Video recorder application 120, meanwhile, similarly allows user 102 to capture and store one or more videos. FIG. 1 illustrates that user 102 currently employs camera application 118 to take a digital photograph of a house 126 having an address of "2343 S. Garry Rd."

Once user 102 takes a photograph or a video, device 104 may store these files in object store 122. As stated above, object store 122 may store or otherwise have access to one or more objects 122(1)-(N). These objects may include, without limitation, photographs, videos, documents, emails, text messages, voice recordings, and/or any other type of media file.

Finally, device 104 here includes packaging application 124. Packaging application 124 may function to package together a captured object with a time and/or location at which device 104 captured the object, as well as possibly additional data. This additional data may include, for instance, an annotation made by user 102 concerning the captured object. Packaging application 124 may then transmit this data package over network 106 for publishing on a map that is associated with user 102 and/or on a map that is associated with one or more other users. As such, user 102 may provide annotation(s) on map(s) that may be later consumed (e.g., viewed, watched, listened to, etc.) by user 102 and/or by other users.

In some instances, packaging application 124 creates and sends such a package in response to user 102 capturing the object. That is, application 124 may create and send a package simply in response (e.g., direct response) to user 102 taking a photograph of house 126. Therefore, user 102 merely needs to take a photograph in order to have the photograph (and corresponding time and/or location data) uploaded to the user's map or maps. Of course, in instances where device 104 is unable to contact network 106 (e.g., because device 104 is "out of range"), then packaging application 124 may store the data package and upload the package when device 104 is able to contact network 106. In still other instances, packaging application 124 may refrain from sending the package until user 102 issues such a command. An account management application 125 can allow the user to define a condition(s) for sending the package. For instance, the account management application can allow the user, such as through one or more user-interfaces, to define whether packages are sent automatically or upon user instruction. Further, the account management application 125 can allow the user to define to which map(s) packages should be published. Examples of user-interfaces that can be generated by the account management application are described below in relation to FIGS. 10-13.

FIG. 1 depicts an illustrative data package 128. Data package 128 includes a header 130 and an object 132. Here, object 132 comprises a photograph of house 126. In other implementations, object 132 may comprises a video or any other type of object. Header 130, meanwhile, here includes a location 134, a time 136, and additional data 138. As discussed above, GPS application 114 may have determined location 134, which may correspond to a location of device 104 when user 102 took the picture of house 126. Therefore, location 134 may approximately comprise the address of house 126 (2343 S. Garry Rd.). Of course, while GPS application 114 may determine locations with reference to any type of coordinate system, this application likely determines location 134 in terms of global latitude and longitude coordinates. Furthermore, while FIG. 1 illustrates a data package having a header and an object, the object (here, photograph 132) may be associated with the location, time, and/or additional data in any other manner.

In instances where object 132 comprises a video, this video may be associated with multiple different locations. That is, location 134 may actually comprise a variety of locations where user 102 captured the video. For instance, location 134 may comprise GPS coordinates where user 102 began capturing the video, GPS coordinates of where user 102 stopped the capturing of the video, and GPS coordinates of the path traveled there between. Here, the video may then be associated with this path on an annotated map, as discussed in detail below.

Also as discussed above, time 136 may comprise the time and/or the date at which user 102 took the picture of house 126. This may be a single time (e.g., a single timestamp) or time 136 may define an interval of time (e.g., in the case of a video recording). Finally, header 130 may include additional data 138. Data 138 may include, for instance, an annotation made by user 102. This annotation may comprise a voice recording, video clip, or text, for instance. Here, envision that user 102 typed "Great House!" into device 104 and associated this message with photograph 132. Packaging application 124 may accordingly include this annotation with data package 128 for publishing on the user's map.

FIG. 1 further includes details about site 108, which functions to publish annotated digital maps, such as maps created and maintained by user 102. In the illustrated (but non-limiting) environment shown in FIG. 1, site 108 includes server-side map processing functionality (MPF) 140 for interacting with one or more client devices, such as representative client device 104. In the implementation most often evoked herein, architecture 100 allocates all (or most) of the map-related functionality to server-side MPF 140. In an alternative case, the map-related functionality can be distributed between server-side MPF 140 and optional client-side map processing functionality (MPF) (not illustrated). In yet another alternative case, selected features of site 108 can be implemented using peer-to-peer (P2P) technology, thereby reducing or eliminating the role of server-side MPF 140.

Turning to the server-side aspects of site 108, the purpose of MPF 140 is to annotate a map produced by a raw map source 142. The map produced by raw map source 142 therefore serves as a base or substrate. MPF 140 metaphorically annotates the map by "placing" objects "on top" of the underlying map substrate.

Raw map source 142 represents any entity or combination of entities that produces an underlying digital map. As stated above, the term "map" is intended to have broad connotation, referring to any representation of the spatial organization of features within an area. In the case most commonly evoked, a map represents a tract of land that shows the location of roadways, population centers, natural landscape features, and so forth. Raw map source 142 can generate a map based on information collected from various sources, such as satellite photographs, aerial photographs, various cartographic databases, and so forth. The raw map source 142 can specify the location of elements within such a map using any kind of coordinate system. In a common case, the map has two dimensions. The elements in this type of map can be unambiguously described by specifying the X-Y coordinates of these elements. In other implementations, a map generated by raw map source 142 can have three or more dimensions.

In one implementation, the entity that administers server-side MPF 140 is the same entity that administers raw map source 142. In this case, MPF 140 allows the user to annotate maps that MPF 140 itself produces. In another implementation, different respective entities administer server-side MPF 140 and raw map source 142. In this case, MPF 140 may allow the user to annotate maps that are made publicly available by another commercial entity. For example, MPF 140 can be used to annotate raw maps produced by Yahoo®, Inc. of Sunnyvale, Calif., or Google®, Inc. of Mountain View, Calif., and so on. In other words, raw map source 142 in this case corresponds to a website administered by Yahoo®, Inc., Google®, Inc., and so on.

Server-side MPF 140 itself includes a collection of annotation tools 144 and one or more applications 146. Annotation tools 144 refer to modules that perform basic operations related to the annotation of maps. Applications 146 refer to functionality that incorporates one or more of annotation tools 144, or which otherwise relies on one or more of annotation tools 144. In one case, a single entity administers both annotation tools 144 and applications 146. In another case, a first entity may administer annotation tools 144, while one or more other entities may create applications 146 which rely on annotation tools 144.

A first tool comprises an account management module 148. The purpose of account management module 148 is to establish and maintain user accounts. A user account enables a user to interact with MPF 140. In one illustrative implementation, account management module 148 registers a user by collecting various information items regarding the user, such as: the name of the user; the physical address of the user; the Email address of the user; a billing address of the user and payment arrangements made by the user (if MPF 140 is optionally set up as a fee-based service); a user-selected ID; a user-selected password, and so on. The account management module 148 can store all of the collected information items in a user profile store 150. Account management module 148 can subsequently grant access to MPF 140 in conventional fashion by requiring the user to enter his or her pre-established user ID and password.

Account management module 148 can work in concert with, or in place of, the computing device's account management application 125. For instance, the account management module can allow the user to define how packages are handled. In some implementations, the computing device's account management application 125 may primarily perform this function. In such cases, the account management module 148 may simply provide a back-up of user defined conditions relating to package handling.

In other implementations, such as more centralized implementations that allow computing device 104 to function as a thin-client, the account management module 148 may cause user-interfaces to be generated on the computing device 104. For instance, the account management module 148 can cause user-interfaces to be displayed on computing device 104 which allow the user to define conditions for handling data packages 126. For instance, the user can utilize the user-interfaces to define conditions associated with his/her account. For example, the user can define particular maps to which data packages are to be published. This information can then be stored by the account management module 148.

In some configurations, data packages can be automatically uploaded from computing device 104 to MPF 140. Once received at the MPF, the account management module 148 can publish the data packages according to the conditions set by the user and saved in the account management module. Examples of user-interfaces that can be generated by the account management module 148 are described below in relation to FIGS. 10-13.

MPF 140 can also include a map creation and publication module 152, referred to for brevity as CP module 152. As the name suggests, CP module 152 performs two roles. As a first role, CP module 152 allows the user to create a new map. It performs this task by allowing the user to access a particular map created by raw map source 142 and then store this map as a user-selected file name. Further, CP module 152 allows the user to assign a default view and scale to the created map. This default view establishes a center of focus of the map, as in a map which focuses on the city of Yakima has a first view and a map that focuses on the city of Spokane has a second view. The scale defines a level of magnification of the map. When a previously-created map is later activated, CP module 152 can present the map using the stored default view and scale.

As a second role, CP module 152 allows the user to publish a map so that other users can potentially access this map. CP module 152 publishes the map based on a user's selection of a security option. A first selectable security option allows the user to publish the map without restriction, thereby enabling any user to access the map without restriction ("a public map"). A second security option allows the user to publish the map in protected form, such as by making access to the map dependent on the input of a valid password ("a protected map"). This security provision allows only a group of users who happen to know the password to access the map. A third option allows the user to store the map in a private form such that only the user himself or herself can access the map ("a private map").

Presuming that a user can access the map, CP module 152 can optionally allow the user to perform various actions with respect to the map. For example, CP module 152 can optionally allow a user to modify a map created by another user. CP module 152 can also optionally allow the user to transfer a map to another user (e.g., via Email, Instant Messaging, etc.). Through these sharing provisions, site 108 can establish a social network that is centered on the use of a map of common interest to the members of the network. To cite merely one example, site 108 can allow a group of outdoor enthusiasts to establish a community map that reflects a shared interest in a national park. Any of the users can annotate the community map with photographs, textual descriptions, links to personal maps, and so forth, such that the community map presented at any given time may reflect the collaborative input of many users.

CP module 152 can retain annotated maps in a map store 154. In one case, map store 154 stores actual map data that is used to construct the maps, including underlying raw map "substrate" data. In another case, map store 154 provides references which simply point to raw map data maintained by some other entity, such as raw map source 142. In other words, in the latter case, map store 142 may not store actual raw map data.

MPF 140 can also include an annotation module 156. Annotation module 156 implements several operations devoted to supplementing a map with objects. As stated above, the term "objects" can represent any type of information, including, but not limited to: alphanumeric labels; iconic labels; still picture information (such as JPEG digital photographs, etc.); audio information (such as music, sound effects, spoken-word content, etc.); video content (such as MPEG video, etc.); path-related information; hypertext link-related information; Extensible Markup Language (XML) scripts; Flash content; additional map information, and so on.

Annotation module 156 can associate an object with a defined location within a map. Annotation module 156 can perform this task by linking the object to a defined X-Y position in the coordinate system of the map. In one implementation, this linking is performed by allowing the user to manually point to a location in the map. In another implementation, the object may already have position information associated therewith, such as in the case of a digital photograph that may incorporate GPS data that describes the location where the photograph was taken (e.g., via GPS application 114). In the latter case, the annotation module 156 can include a conversion module (not shown) which converts various ways of representing position information into a standard representation of position. This provision effectively allows different sources of geographic information to be combined together, such as by allowing an object with an X-Y position specified using a first coordinate system to be placed on a map that is structured using a second coordinate system.

Annotation module 156 can function in a manual mode or an automatic mode. In the manual mode, annotation module 156 can allow the user to: (a) select a location within a map; (b) select an object to be placed at the selected location; and (c) link the selected object to the selected location on the map. As a preliminary task, annotation module 156 can allow the user to upload certain objects to an object store 158. For example, the user can upload digital pictures, media files, text documents, etc. to object store 158. Annotation module 156 can then allow the user to link an uploaded object stored in object store 158 to a selected location on the map. Indeed, in one implementation, annotation module 156 can allow the user to link the same uploaded object to multiple locations within a single map or various locations in different respective maps. This linking operation does not require the user to perform multiple uploading and storing operations to establish redundant copies of the object. This provision is beneficial because it reduces the processing and storage burden placed on MPF 140, and also potentially results in a better end-user experience.

The manual mode of annotation module 156 also allows the user to annotate the map with a path. For example, the path may represent a travel route. Annotation module 156 can allow the user to create a path by successively specifying path nodes on the map. The path nodes define different segments (or "legs") of the path.

In the automatic mode of operation, annotation module 156 automatically investigates a data source, extracts one or more objects from the data source, and then links the extracted objects to a map. In operation, annotation module 156 first receives set-up information which specifies at least one data source and at least one selection criterion. Annotation module 156 can then mine the specified data source to identify objects that satisfy the selection criterion. To present one concrete example, the user may select a Really Simple Syndication (RSS) news feed as a data source. The user may specify an alphanumeric search term as a selection criterion. Based on these inputs, annotation module 156 can periodically examine the RSS feed source to identify any objects that include the alphanumeric search term.

In a next stage of automatic annotation processing, annotation module 156 can determine location information associated with an object extracted from the data source. In one implementation, annotation module 156 can perform this task by identifying the presence of predefined alphanumeric map-related information in the object, such as the name of a country, city, etc. In a next stage, annotation module 156 can then automatically place the object on the map at a position that is based on the determined location information.

In either the manual or the automatic mode of operation, annotation module 156 can store the annotated map in map store 154. In one implementation, MPF 140 can store a map in map store 154, yet store the map's objects separately in object store 158. The map and its associated objects can be linked together using a pointer mechanism or some other linking mechanism. For example, a map can include an associated metadata file which provides file names or other codes which identify the objects used in the map, as well as position data which describe where the objects are placed in the map. The separate storage of maps and objects is efficient because it allows several maps to reference the same object without requiring redundant copies of the objects to be stored.

FIG. 1 further illustrates that annotation module 156 may include a journaling tool 160 and a layering tool 162. Journaling tool 160 allows a user, such as user 102, to create a journal that is associated with a digital map. This created journal may comprise a body of text, an audio file, a video, and/or the like. Furthermore, this created journal may include a timeline that describes a series of events that occurred along the map. Portions of the journal's timeline may be associated with portions of the map. With this association, the annotations on the map may be displayed as another user consumes (e.g., reads, listens to, watches, etc.) the journal. Furthermore, it is noted that the user may manually make the association, or the association may be automatically created. For instance, when a user such as user 102 captures an object (e.g., photograph 132), the object may be uploaded and automatically associated with a user's journal. Here, the picture may be automatically associated with a timeline of the journal via stored time 136, or the picture may be automatically associated with the journal via stored location 134.

For instance, envision that user 102 has annotated a map that includes multiple pictures taken at different times and locations on the map. Envision also that user 102 writes a journal that describes the user's travels along the map with reference to a timeline. By doing so, the time of the journal may be associated with the time that the pictures were taken. Therefore, when another user reads the journal, corresponding pictures may be displayed as the reading user peruses through the journal.

In addition or in the alternative, pictures or other objects (e.g., videos) may be associated with the timeline of the journal itself. Again, this association may be created manually and/or automatically upon capturing an object. In either instance, when a viewing user consumes (e.g., reads, watches, listens to, etc.) the journal the objects may be similarly consumed. For instance, if a timestamp of a particular picture is associated with a particular time of the journal's timeline, then that picture may be presented to the viewing user when the viewing user reaches the corresponding portion of the journal. Similarly, if a timestamp or time interval of a video is associated with a particular time in the journal, then that video may similarly play when the viewing user reaches the corresponding time in the journal. FIGS. 4-7 and an accompanying discussion describe the functionality of journaling tool 160 in greater detail below.

Layering tool 162, meanwhile, allows each of multiple users to create a layer on a same digital map. As discussed above in regards to a community map, each of these users may upload objects and may associate these objects with locations on the map. These users may alternatively or additionally annotate the map in multiple other ways (e.g., by commenting on pictures, commenting on the map, etc.).

Figure 8:
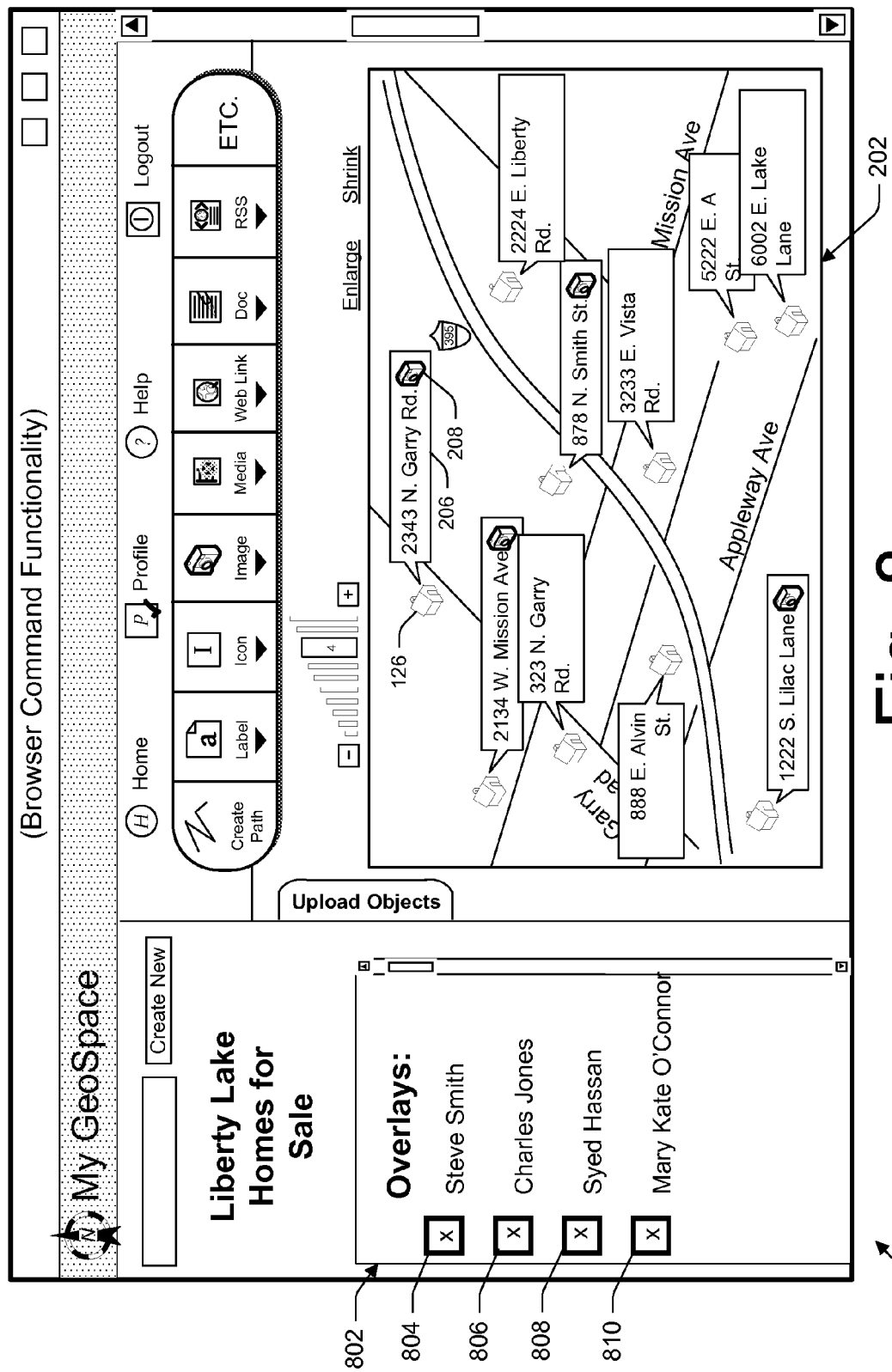
Figure 9:
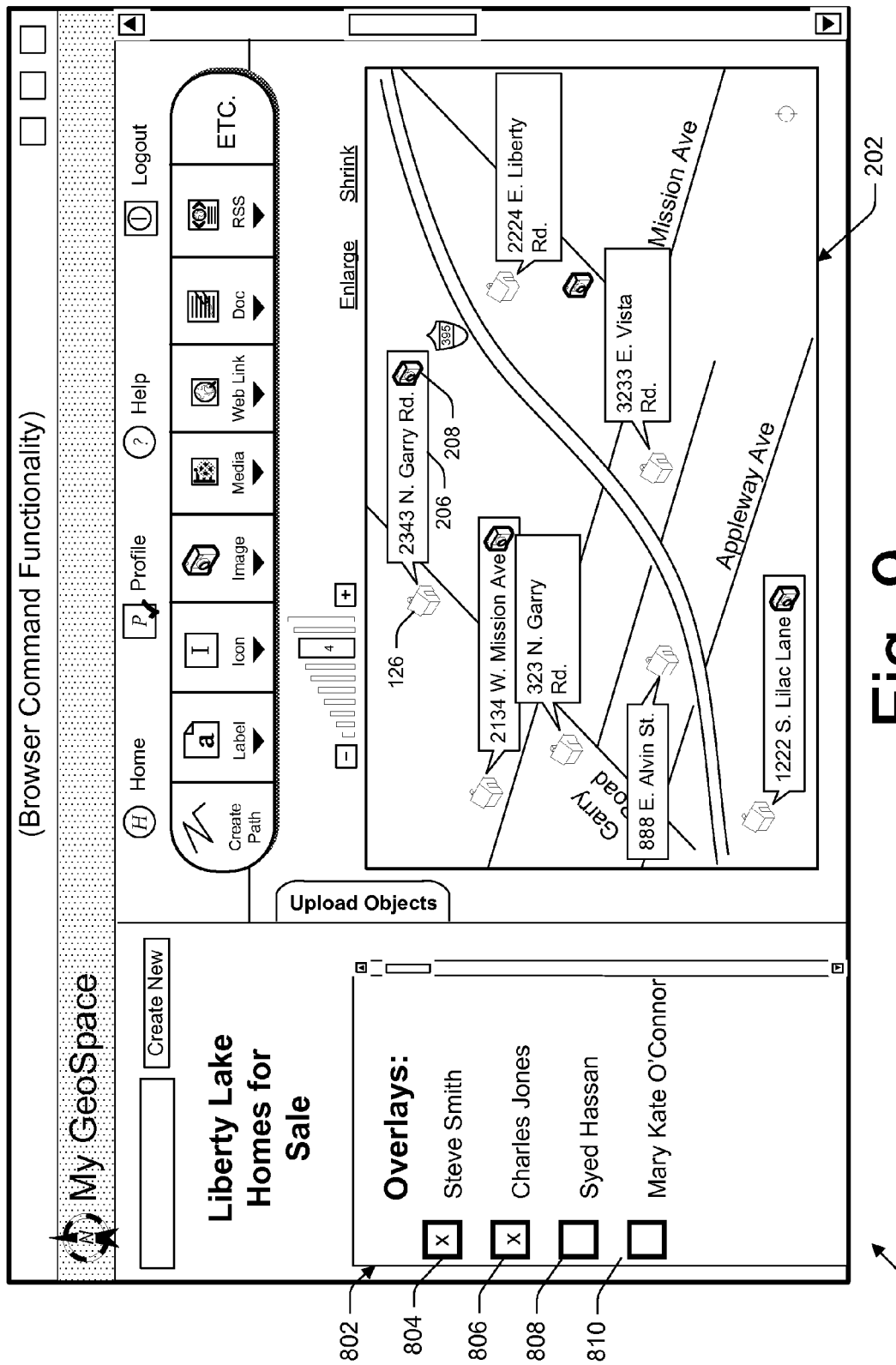
FIG. 9 depicts the illustrative UI from FIG. 8 after the viewing user has chosen to view two overlays and to hide the remaining two overlays.

With use of layering tool 162, users that view the map may selectively choose which layers to view (or hear, if audio annotations are included) and which layers to hide. For instance, envision that three users have annotated a same digital map and each of the three users is therefore associated with a corresponding layer on the digital map. With use of layering tool 162, a user that views the digital map may choose to view zero, one, two, or all three of these layers. Furthermore, the viewing user may alter between these different choices. FIGS. 8-9 and an accompanying discussion describe the functionality of layering tool 162 in greater detail below.

MPF 140 also includes a map zoom control (ZC) module 164. The purpose of ZC module 164 is to establish the zoom levels at which certain objects are made visible in a map. In operation, ZC module 164 can allow the user to select a minimum zoom level and/or a maximum zoom level. The minimum zoom level and the maximum zoom level define a range of zoom levels. If the user selects a zoom level that lies within the visible range, ZC module 164 will present a visual depiction of the object in question. If the user selects a zoom level that lies outside the visible range, ZC module 164 will conceal the object. A range can be selected which has only one fixed endpoint. Such a range is created by specifying either a minimum zoom level or a maximum zoom level, but not both levels.

In another implementation, ZC module 164 in conjunction with annotation module 156 can also operate in an automated mode. In the automated mode, site 108 can determine the relevance of an object based on at least one relevance criterion, and then select a zoom range based on the determined relevance. For example, site 108 can determine that an object is highly relevant because it has proven popular among users (as reflected by the fact that many users have "clicked on" the object in the map). As a result, ZC module 164 can define a zoom range that allows the object to appear over a relatively wide range of zoom levels. Other relevance criteria for assessing relevance can be used.

Finally, a map search module 166 allows a user to perform a search that involves map information. Map search module 166 can use the map information in different ways in performing a search. In one technique, search module 166 can allow the user to search within an individual map by specifying a bounding box within the map. The bounding box demarcates a rectangular area within the map, although annotation module 156 can also allow the user to select a bounding area having another shape. The user can also specify at least one selection criterion. Based on these selections, map search module 166 determines whether any objects within the bounding box satisfy the selection criterion. Map search module 166 can then present the results of its determination to the user.

In another case, map search module 166 can formulate a search term based on information extracted from the map, and then this search term is applied as a query to one or more data sources. In operation, search module 166 can allow the user to specify a data source and a bounding box. Search module 166 can extract one or more parameters based on objects identified within the bounding box, and can then use these parameters to construct a search term. Search module 166 then uses that search term in performing a search within the selected data source.

In another case, map search module 166 can allow the user to search a collection of maps, potentially created by different respective users. In operation, the user can enter a search term (and optionally a bounding box). Search module 166 can then investigate the collection of maps to determine whether it includes any objects which match the search term. In performing its search of the maps, map search module 166 can also perform a supplemental search in one or more other data sources, or otherwise rely on the information in these data sources. It is noted that the techniques described above are illustrative and that still other search strategies can make use of annotated maps.

Illustrative User Interfaces (UIs)

Figure 2:
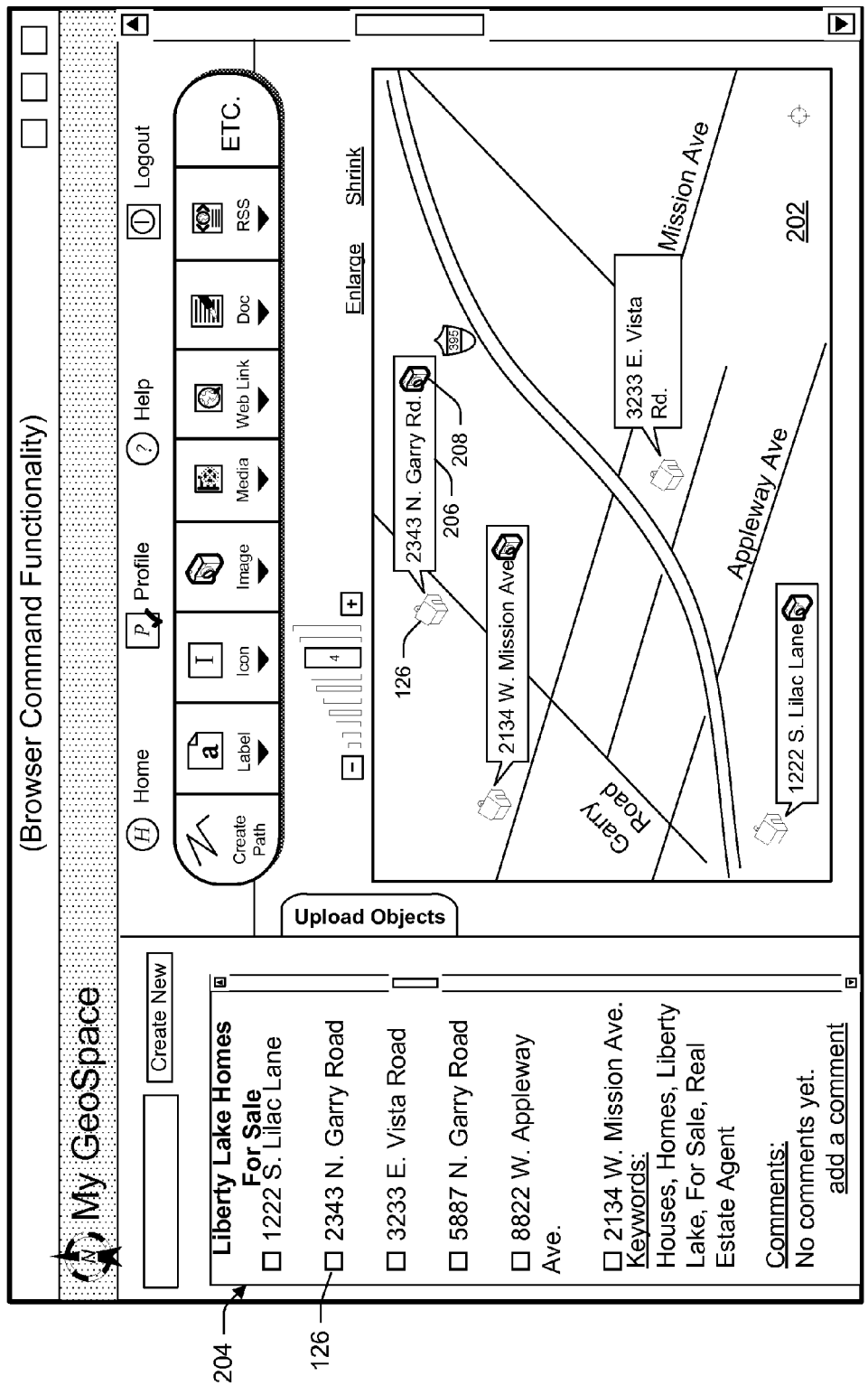

FIG. 2 depicts an illustrative user interface (UI) produced by the system of FIG. 1. Here, the UI comprises a page 200 that may be served to and rendered by a requesting client computing device. Page 200 includes a map 202 (entitled "Liberty Lake Homes for Sale") that has been annotated with locations of houses, including house 126 illustrated by FIG. 1. Page 200 further includes a menu 204 listing the homes illustrated by map 202.

Menu 204 includes an indication that house 126 of FIG. 1 is for sale and is illustrated on map 202. Map 202 shows house 126 and a corresponding address 206. Returning to the example of FIG. 1, user 102 captured a photograph of house 126 with use of a mobile phone (device 104). At approximately the same time, GPS application 114 determined current location 134 and time 136. Packing application 124 then appended this information as a header to photograph 132 to form data package 128. Packaging application 124 then transmitted data package 128 over network 106 to site 108.

When site 108 receives data package 128, site 108 may automatically annotate map 202 to include house 126 at an appropriate location on map 202. That is, site 108 annotates map 202 to include house 126 at location 134 determined by GPS application 114. Map 202 may also include time 136 corresponding to the time at which user 102 captured photograph 132. Furthermore, while map 202 here includes address 206 of house 126, other implementations may not include the address but may instead simply locate house 126 in a proper location on map 202. Other implementations may also annotate map 202 to include photograph 132 at locations on the map other than the address 206 of the house 126.

Furthermore, if a user captures a video, then the video may be associated with multiple locations rather than a single location. For instance, the video may be associated with a path that corresponds to where the video was captured. Here, map 202 may be annotated at a single location (e.g., the location where the user began or finished capturing the video). Alternatively, map 202 may be annotated at multiple locations (e.g., the location where the user began capturing the video and where the user finished capturing the video). In still another configuration, map 202 may be annotated at multiple locations to convey the entire path corresponding to where the video was captured. In the latter instances, map 202 may include an icon spanning most or the entire path associated with the video.

In instances where map 202 includes an annotation associated with a video, map 202 may shift while a user watches the video. For instance, when the user chooses to watch the video associated with the map, the map may pan and/or zoom in accordance with the video. That is, the map may begin centered on a beginning location of the video and may pan towards the ending location of the video as the video plays. Furthermore, the map may also zoom in and/or out during the playing of the video.

Returning to the illustrated example, map 202 further includes an icon 208 illustrating that the annotation associated with house 126 includes a photograph. Here, icon 208 comprises a camera, although other implementations may employ any other sort of icon. Furthermore, map 202 may employ different icons depending on the type of underlying object. For instance, a notepad may represent a text file, a video camera may represent a video, and so on.

Figure 3:
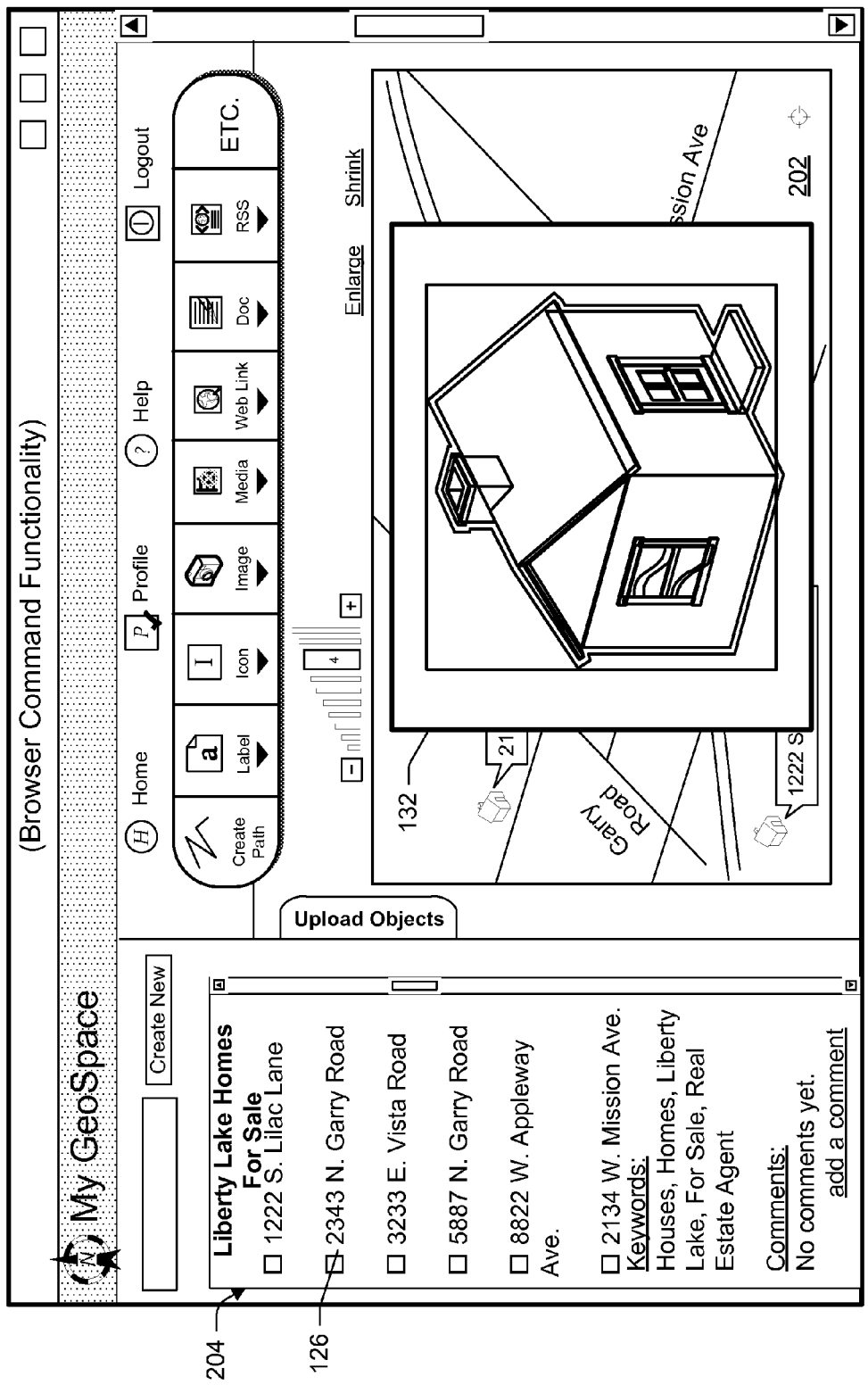

FIG. 3 illustrates page 200 after a user has selected house 126 from map 202. Because this annotation is associated with a photograph of house 126, map 202 here displays photograph 132 of house 126. If the object were an audio file or video, then selection of house 126 may instead play these file(s).

Figure 4:
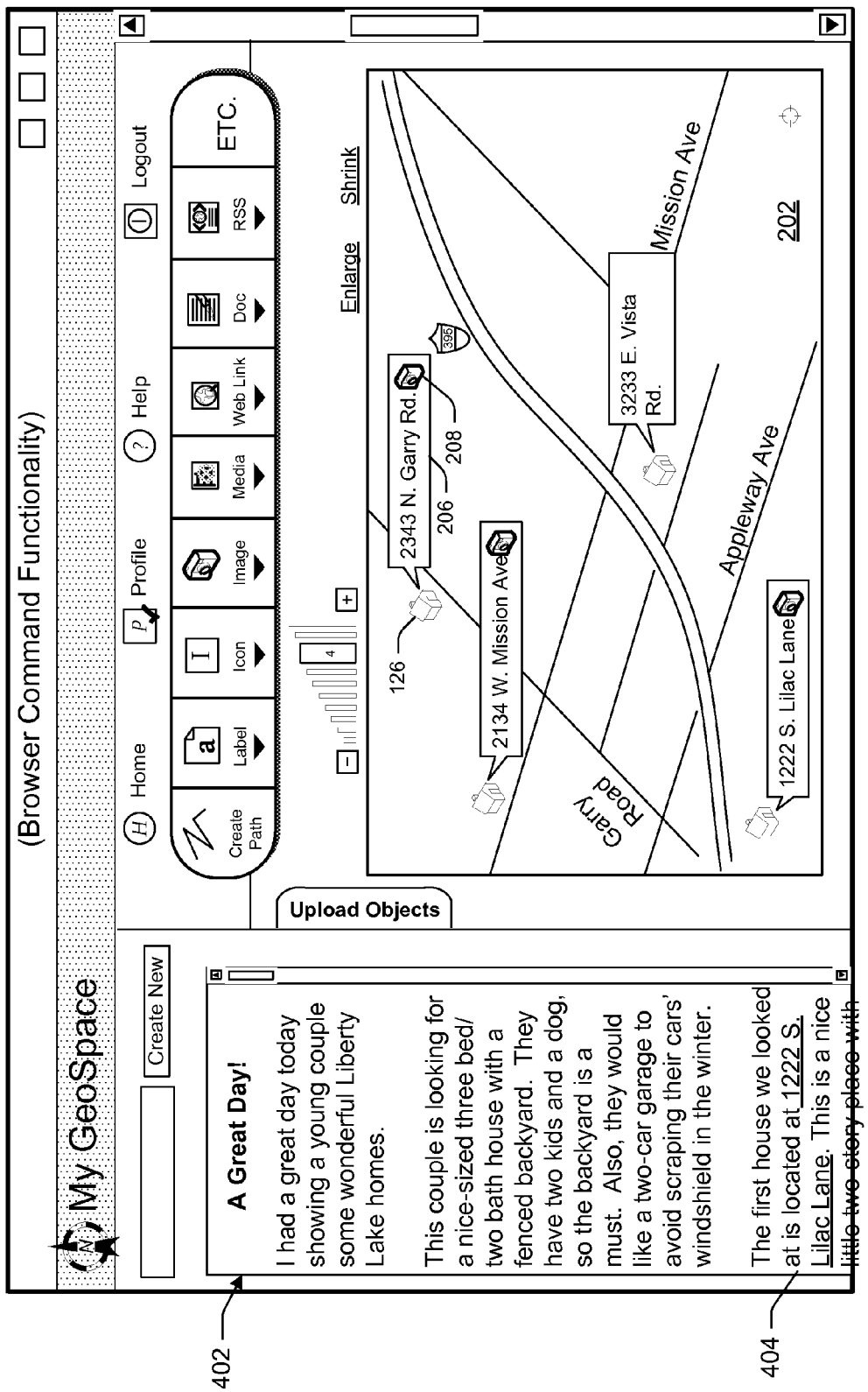

FIG. 4 illustrates an illustrative UI that journaling tool 160 may enable. Here, the illustrated UI comprises a page 400 that may be served to and rendered by a requesting client computing device. Page 400 includes a map (here, map 202 entitled "Liberty Lake Homes for Sale") that has been annotated with locations of houses, including house 126 illustrated by FIG. 1. Page 200 further includes a journal 402 that a user such as user 102 has created. While journal 402 here comprises a text file, it is specifically noted that other implementations may comprise an audio journal, a video journal, and/or a journal comprising any other type of media file.

Here, journaling tool 160 (FIG. 1) has associated journal 402 with map 202. That is, portions of journal 402 have been associated with portions of map 202. Therefore, as a user reads through journal 402, the display of map 202 may change. For instance, journal 402 here references multiple houses illustrated by map 202. Therefore, as the reading user reaches each of these portions of the journal, an associated object (e.g., a picture, video, audio file, text file, etc.) may be displayed on map 202. Furthermore, map 202 may move (e.g., pan, zoom, etc.) as the user reads through journal 402. By associating journal 402 with map 202 in one or more of these manners, the reading user is able to visually (or audibly) travel the path laid out in the text of journal 402.

In addition or in the alternative, journal 402 may include a timeline. Here, one or more objects (e.g., pictures, videos, etc.) may be associated with this timeline. For instance, time 136 of data package 128 of FIG. 1 may be associated with a corresponding time in the journal's timeline. Here, when a viewing user reads through journal 402 and reaches a point in the journal's timeline associated with time 136, picture 132 may be displayed. In the example of a video, the video may play at this point. Furthermore and as discussed above, while the video plays map 202 may shift (e.g., pan and/or zoom) according to the path of the video or otherwise.

In the illustrated example, envision that user 102 of FIG. 1 comprises a real estate agent who authored journal 402. Envision further that user 102 wrote journal 402 during a day that user 102 drove a young couple around the town of "Liberty Lake" in search of a home to purchase. Therefore, journal 402 here includes links or references to multiple homes illustrated by map 202. For instance, FIG. 4 illustrates a link 404 that references a house located at 1222 S. Lilac Lane. Therefore, as a user reads through journal 402 and reaches each of these links or references, map 202 may display an object (here, a photograph) associated with each respective house. In some instances, these photographs were automatically uploaded with location information according to the techniques described above.

Figure 5:
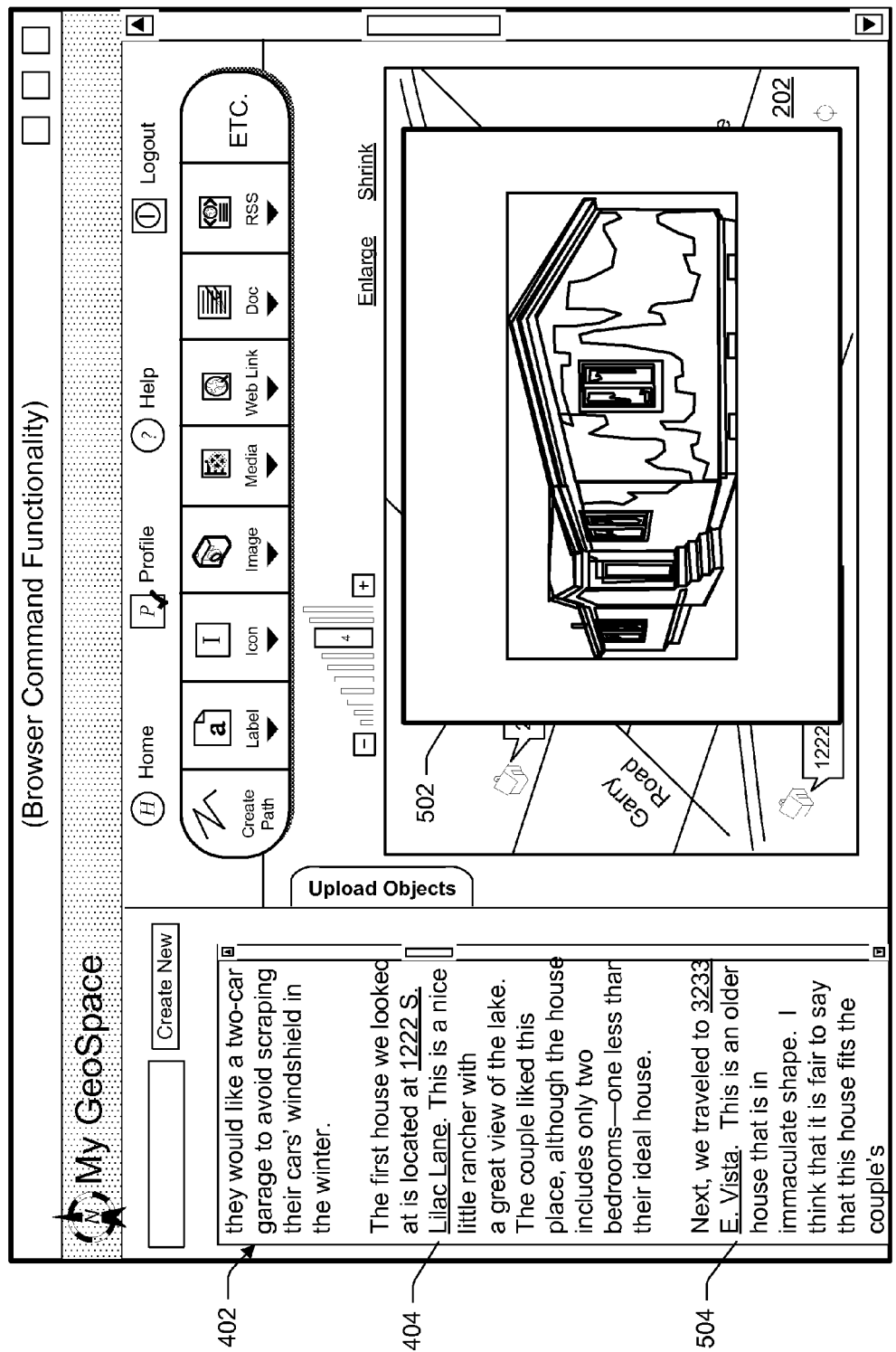

FIG. 5 illustrates page 400 after the reading user has scrolled down in journal 402. Here, the reading user has reached a predetermined location in journal 402 that corresponds to link 404 (associated with the house located on Lilac Lane). As such, map 202 here displays a photograph 502 of this house. Furthermore, journal 402 is shown to further include a link 504 to another house, located at 3233 E. Vista Road.

Figure 6:
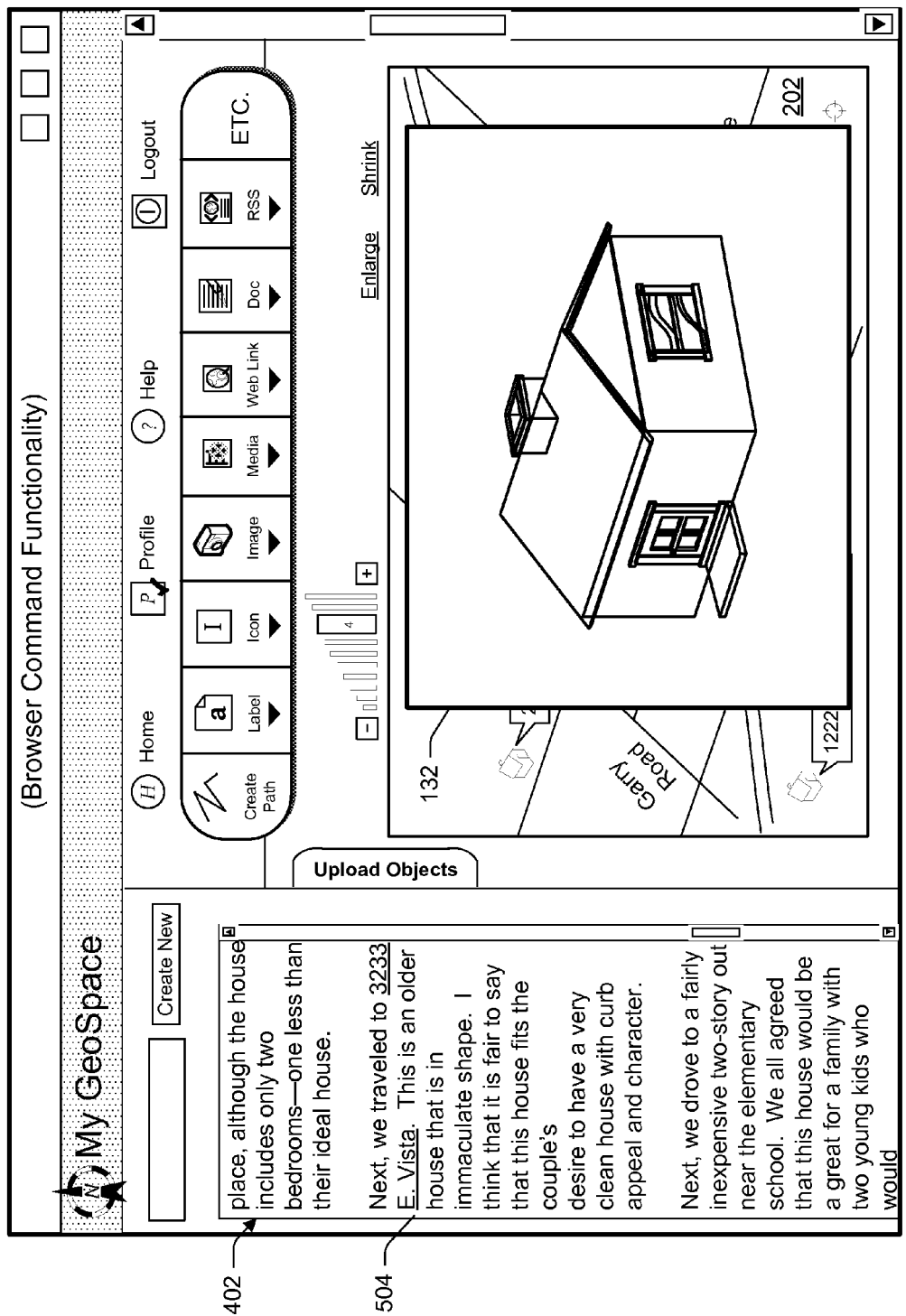

FIG. 6 illustrates page 400 after the reading user has scrolled even further down journal 402. Here, the user has reached a location in journal 402 associated with link 504. Map 202 therefore displays an associated photograph 602 that user 102 captured of the house located on Vista Road.

Figure 7:
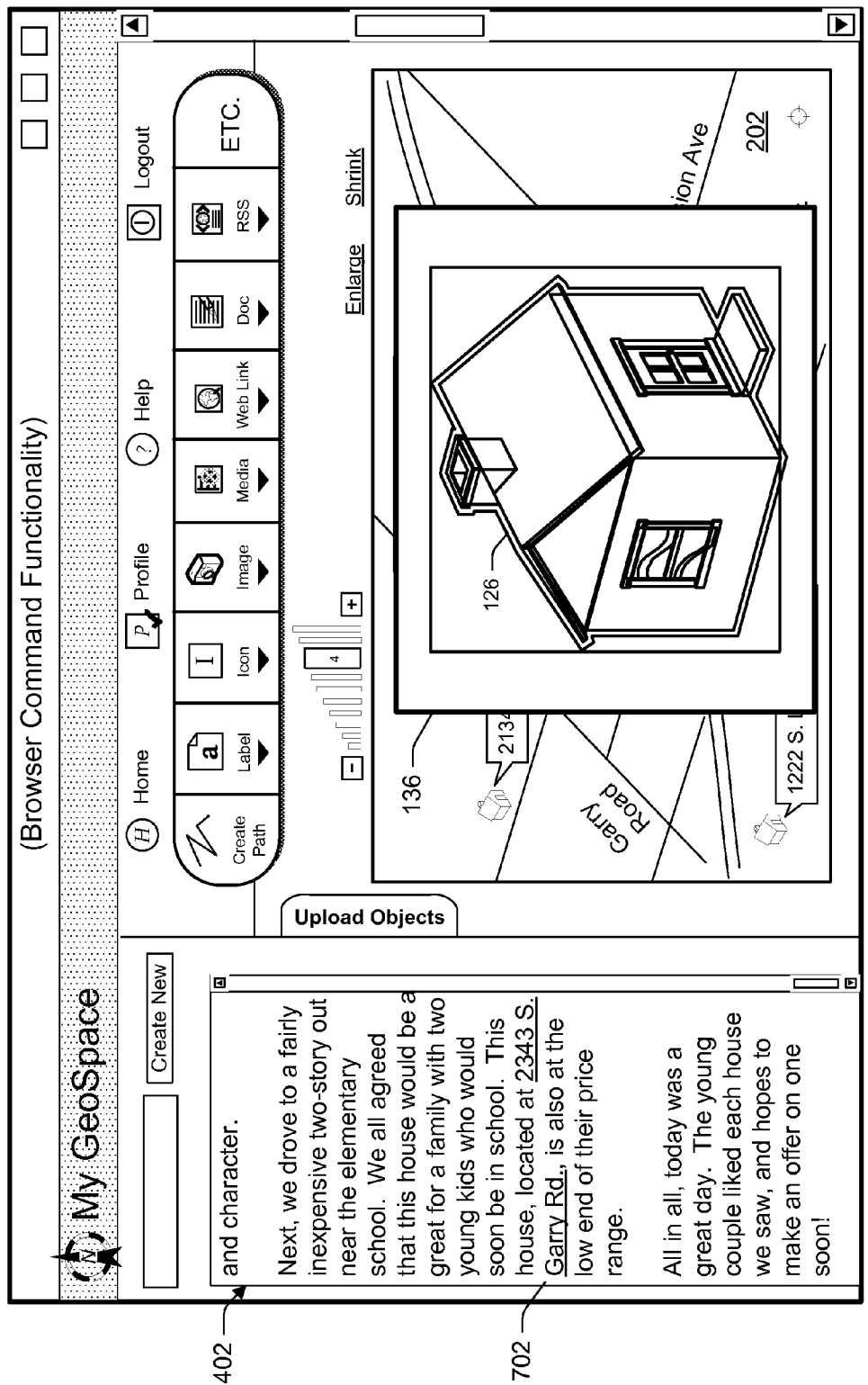

FIG. 7 next illustrates page 400 after the reading user has scrolled down to the end of journal 402. As illustrated, this portion of journal includes a link 702 to house 126, which was illustrated by and discussed with reference to FIG. 1. Because the reading user has reached this portion of journal 402, map 202 displays photograph 132 of house 126.

While FIGS. 5-7 have illustrated that map 202 displays photographs associated with journal 402, it is specifically noted that other implementations may present other types of objects. Again, these objects may further include text files, audio files, video files, and/or any other type of media file.

FIG. 8 depicts another illustrative UI that includes multiple overlays on an illustrated map. Here, the UI comprises a page 800 served by site 108 and rendered by a computing device. As illustrated, page 800 includes map 202 as well as a menu 802 entitled "Overlays". In some instances, an overlay comprises one or more annotations that a user has included on map 202. For instance, envision that each of multiple users has uploaded objects (e.g., pictures, videos, etc.) and/or has annotated map 202 by commenting on locations, pictures and/or the map itself. Therefore, annotated digital map 202 may display each of these annotations that each user has included on the map.

Here, menu 802 lists a number of overlays 804, 806, 808, and 810, each corresponding to a particular user. Here, page 800 allows a viewing user to select which of the multiple overlays to view on map 202. That is, the viewing user may decide whether to view none, some, or all of overlays 804-810.

To so select none or more of these overlays, menu 804 here includes a respective check box next to each overlay. Therefore, FIG. 8 illustrates map 202 at a time when the map displays each of overlays 804-810. In some instances, a creator of map 202 or an administrator of site 108 may determine which overlays are selected by default when a viewing user first visits page 800. Here, the default view of map 202 includes each of overlays 804-810.

FIG. 9, meanwhile, continues the illustration of page 800 at a time after the viewing user has de-selected overlays 808 and 810. As such, map 202 has hidden the annotations provided by these corresponding users. As illustrated, map 202 has hidden three of the houses that the map of FIG. 8 had previously illustrated. Therefore, each of these three annotations was provided by one of the deselected users.

In some instances, a creator of map 202 or an administrator of site 108 determines whether or not viewing users may select and deselect overlays. This creator or administer may also determine, in some instances, whether a viewing user is able to create and/or delete overlays on a particular map. In some instances, varying levels of permission are given to different users. For instance, a first user may not be able to either create or delete an overlay, while a second user may be able to create but not delete an overlay. A third user, meanwhile, such as the creator of the map, may be able to both create and delete overlays on map 202.

In summary, the above examples describe how a user can capture an object on a device. Responsively, the object and corresponding location data can be transmitted for publishing to a map. The user (and/or a different user(s)) can view the object on the map. The following discussion includes examples of how the user can specify conditions relating to an object, such as when the object is transmitted and to where it is transmitted.

Figure 10:
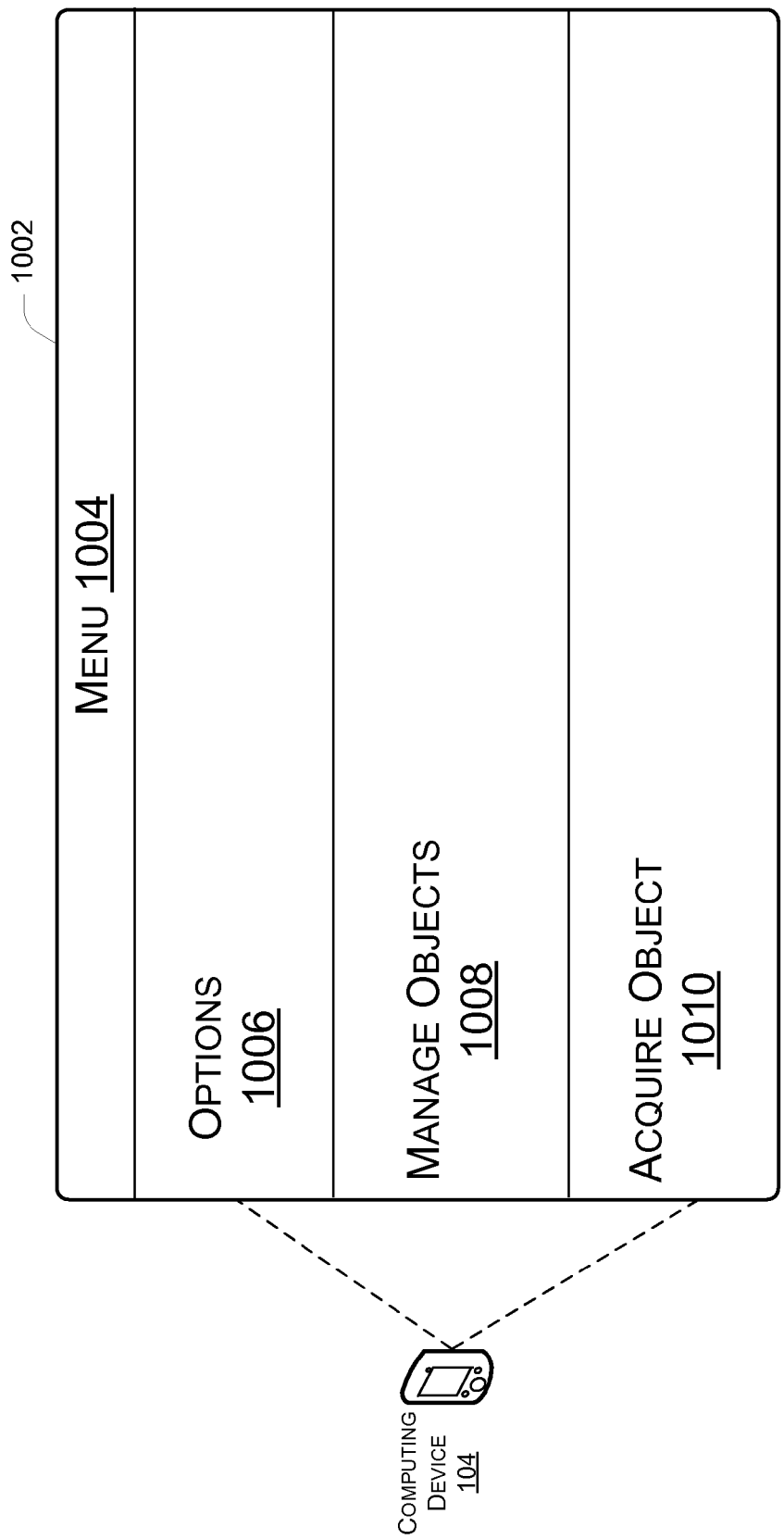
FIGS. 10-13 depict user interfaces that convey publication concepts in accordance with some implementations.
Figure 11:
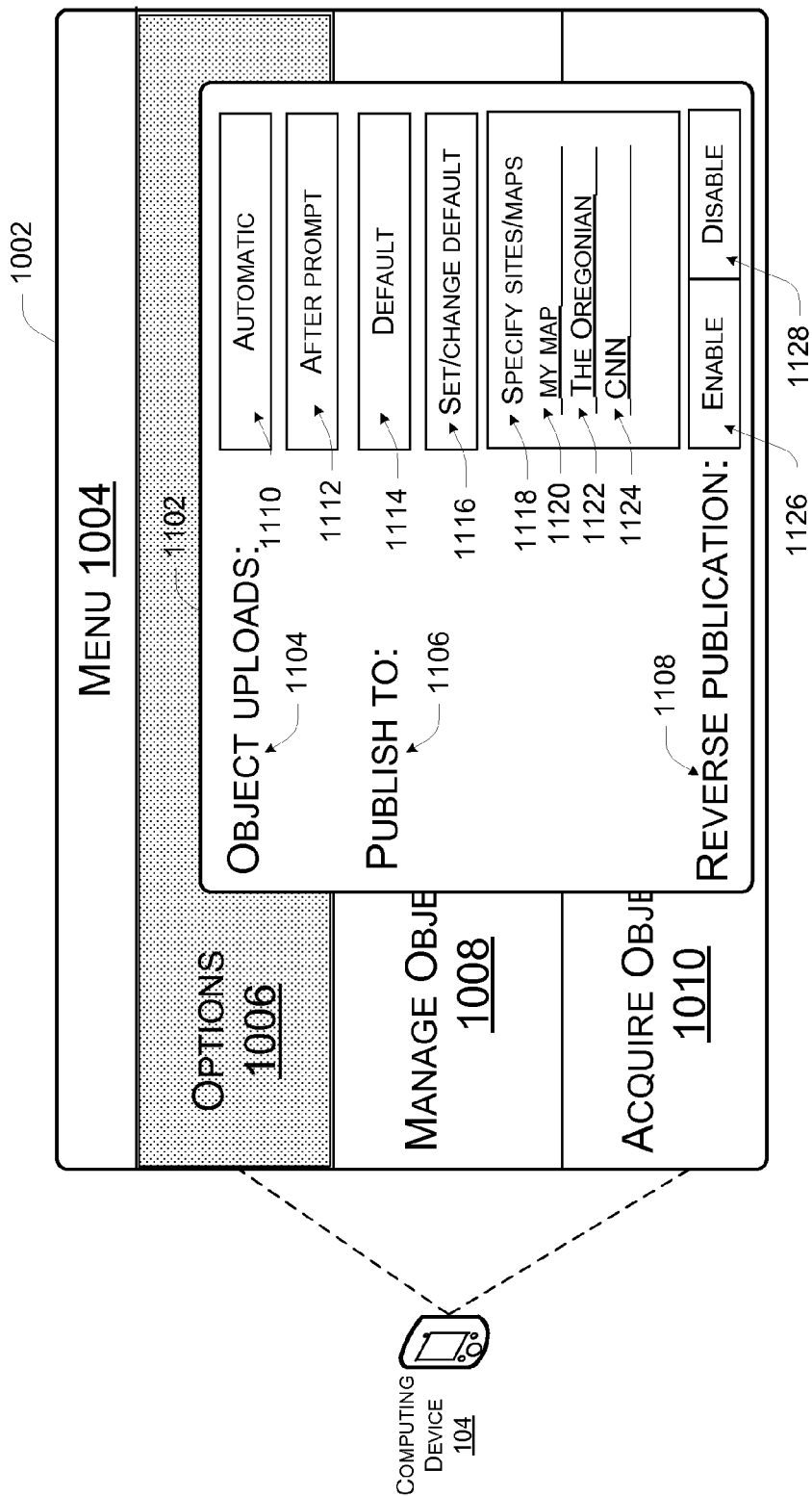
Figure 12:
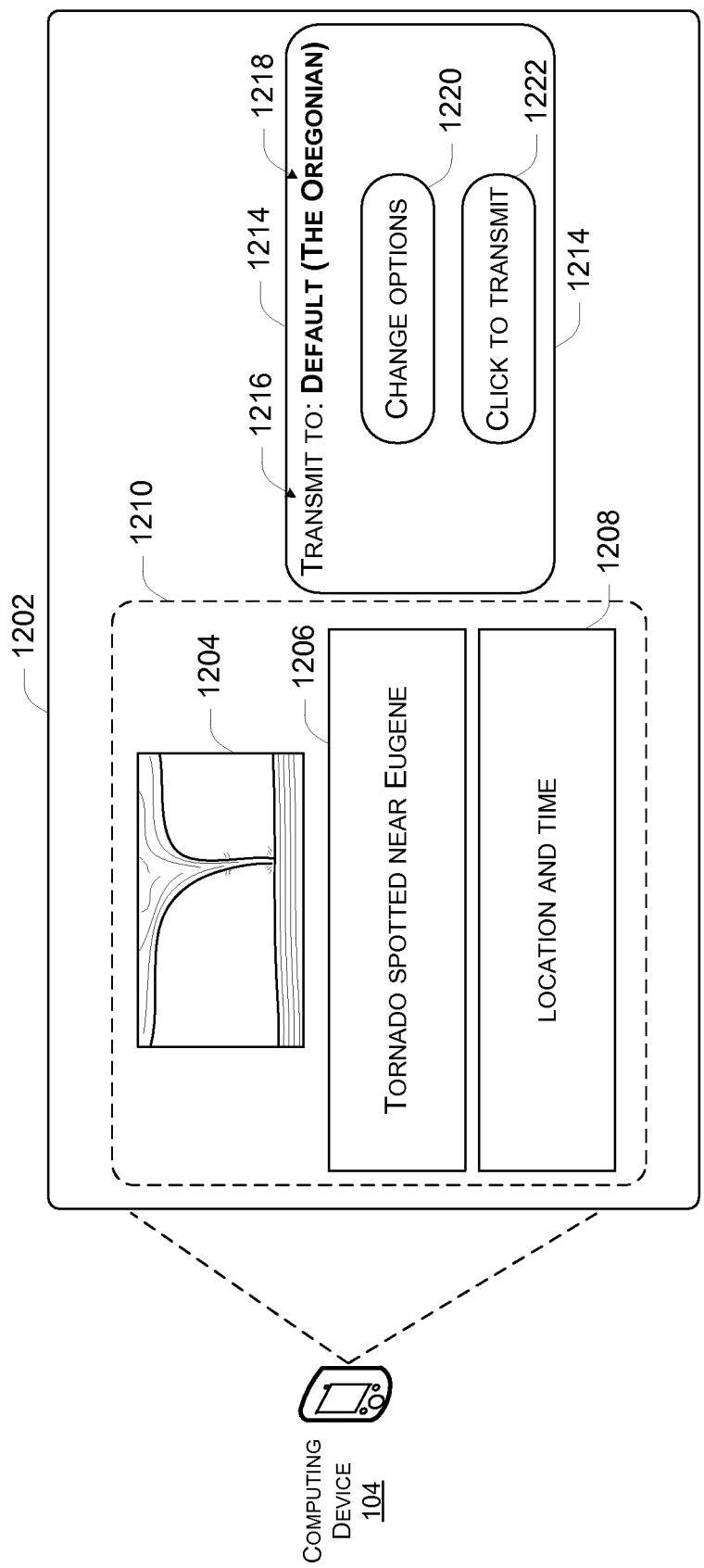

FIGS. 10-12 collectively illustrate by way of example how a user can select publication sites for his/her objects.

FIG. 10 shows a user-interface 1002 that can be displayed on computing device 104 that allows the user to select publication sites. In this case, user interface 1002 includes a menu 1004. The menu includes selectable "options" item 1006, a selectable "manage objects" item 1008, and a selectable "acquire objects" item 1010. The options item 1006 will be discussed in more detail below, but briefly, it allows the user to set various parameters or conditions associated with publishing objects. The manage objects item 1008 can allow the user to perform various functions relative to stored objects. For instance, the user can organize the objects into folders, annotate objects, delete objects, etc. The acquire objects item 1010 brings up a capture functionality, such as a camera functionality or a video camera functionality. Assume for discussion purposes that the user selects options item 1006 to specify conditions associated with transmitting objects.

FIG. 11 shows an options window 1102 superimposed over user-interface 1002 responsive to the user selection mentioned above. In this case, the options window includes three categories; "object uploads" at 1104, "publish to:" at 1106, and "reverse publication" at 1108.

The object uploads category 1104 allows the user to select "automatic" uploads at 1110 or uploading "after prompt" at 1112. The "automatic" upload feature can be used where the user has preset the publishing sites and does not want to annotate captured objects. The "after prompt" 1122 upload option can allow the user to configure the object before it is transmitted. An example of such a configuration is described below in relation to FIG. 12.

The "publish to:" category 1106 can allow the user to specify to publish to "default" sites at 1114, "set/change default" sites at 1116, or "specify sites/maps" at 1118. The default option 1114 can allow the user to maintain existing user-established and/or system-defined publication sites. The set/change default option 1116 can allow the user to set or change the default sites for future transmissions. The specify sites/maps option 1118 can allow the user to manually enter publication sites. In this case, three publication sites that the user has selected previously are prepopulated for the user. Specifically, "my map" meaning the site of the user's own map is prepopulated at 1120. A second prepopulated publication site is "The Oregonian" at 1122 which is a site corresponding to a newspaper published in Portland, Oreg. A third prepopulated publication site is "CNN" at 1124 which is a widely known online news site. As will be discussed below, some sites may be open to publication without condition, other sites may have preconditions that a user must satisfy before being allowed to publish to the site. For instance, the publication site may require the user to sign a citizen journalism pledge where the user agrees to only submit real and accurate material. In these examples a human friendly site is listed, but the underlying IP address can, of course, be known by the computing device 104.

Reverse publication category 1108 can be enabled at 1126 or disabled at 1128. This aspect will be discussed more below in relation to FIG. 13.

Assume for discussion purposes that the user utilized window 1102 to set "The Oregonian" as the default publication site at 1116.

FIG. 12 shows a subsequent user interface 1202 where the user has captured an object, in this case photo 1204. The user can also annotate the photo at 1206. Further, location and time information has been automatically associated with the photo at 1208. Photo 1204, annotation 1206 and associated location and time information 1208 can be considered a data package 1210. A transmission prompt window 1214 is also included on user interface 1202. In this configuration, the transmission prompt window 1214 shows the site that the data package will be transmitted to as the "default" site at 1216. In case the user does not remember, the default site that he/she selected is listed at 1218. The user can select a "change options button" at 1220 if the user is not satisfied with the transmission site. Otherwise the user can select a "click to transmit button" 1222 to send data package 1210. FIGS. 2-9, discussed above, provide examples of how the transmitted data package can be positioned on a map at the selected site and/or viewed by the user and/or other users.

Figure 13:
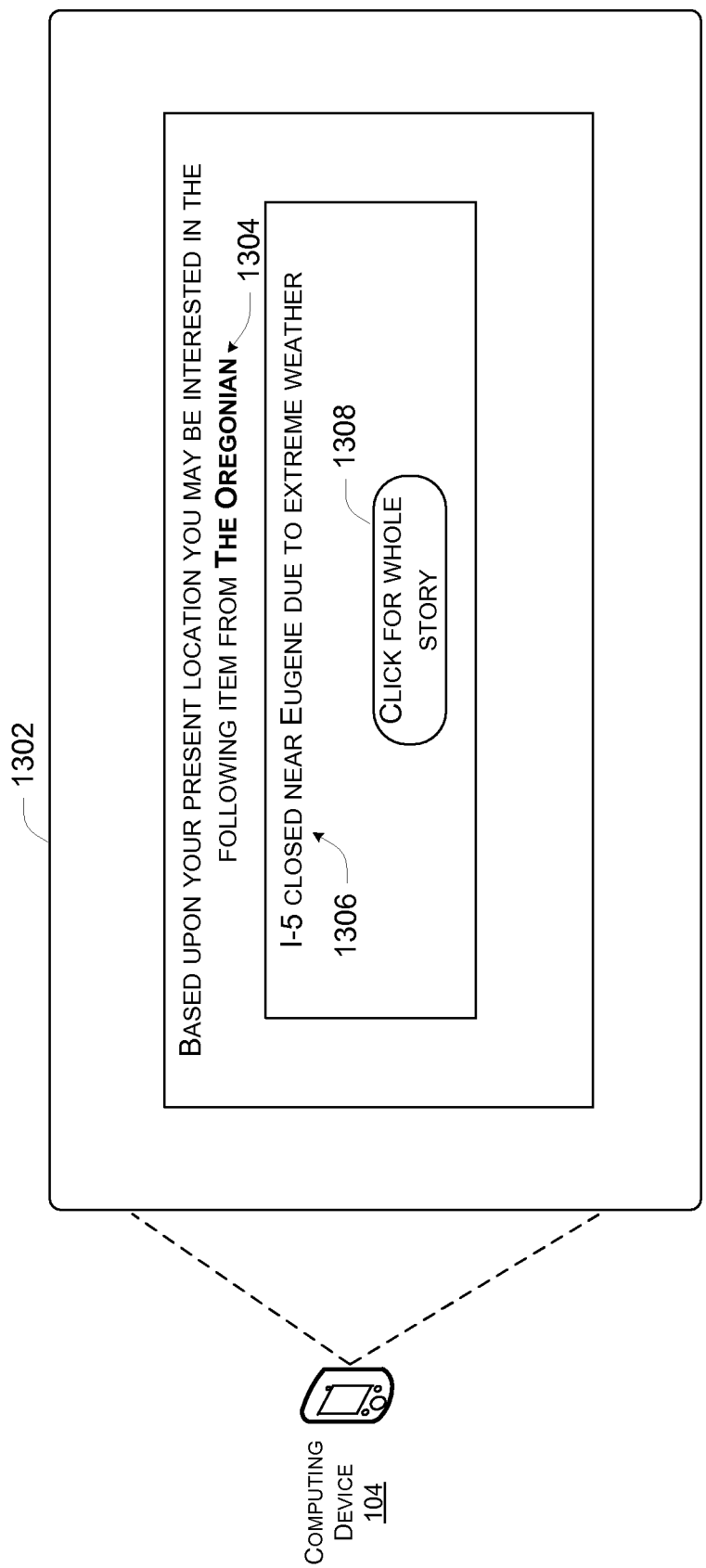

FIG. 13 shows another user interface 1302 on computing device 104. This user interface relates to reverse publication. Reverse publication was introduced above in relation to FIG. 11. Recall that in FIGS. 11-12, The Oregonian was listed as a site to which the user published data packages. Recall further, that the user took picture 1204 near Eugene, Oreg.

In this case, The Oregonian can send content to the user based upon the location of the user (i.e., the user's computing device 104). In this example, the story relates to Eugene which is where the user is presently located. The content can be in the form of text, pictures, video, etc, or a combination thereof. A source of the content is displayed at 1304 and a headline of the content is displayed at 1306. If the user wants to see further content he/she can click to see the whole story at 1308.

In this example, the user location is considered in a static manner, such as the user's coordinates are proximate Eugene. However, other implementations can track location and movement. For instance, the location and tracking data can indicate that the user is headed North on I-5 toward the Portland area. The content sent to the user may then relate not to the user's current location, such as Eugene, but to a projected future location, such as Portland. For instance, the content can be a story about things to do in Portland or an advertisement for a hotel in Portland.

Still another implementation can select content for reverse publication based upon a user-specified location rather than the present location of the user (and his/her computing device 104). For instance, a user that is a citizen journalist with a Vancouver, Wash. newspaper may specify the he/she lives in nearby Battleground, Wash. and that he/she desires to receive content about Battleground regardless of his/her present location. Thus, even when on vacation in Europe the user can receive content about the user-specified location (i.e., Battleground).

Exemplary Publish and Subscribe System Architecture

Figure 14:
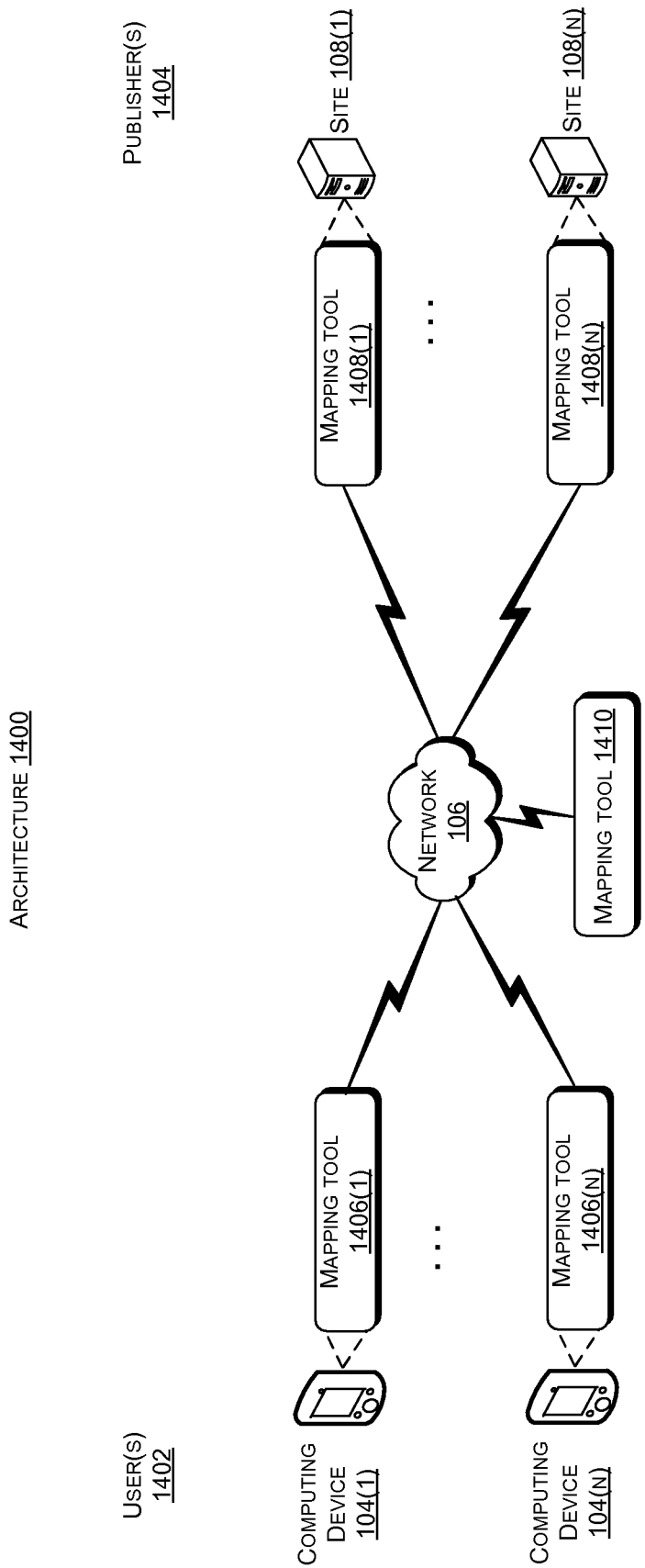
FIG. 14 depicts an exemplary publication architecture in accordance with some implementations.

FIG. 14 shows a mapping architecture 1400 that augments the architecture 100 described above in relation to FIG. 1, which provided great detail about specific components that can cooperatively achieve a mapping functionality. The mapping functionality can allow a user to capture objects and those objects to be associated with a location. The objects and associated locations can be transmitted over a network and published on a map(s) based upon the location. The map(s) may be the user's map or the map of another publishing entity. FIGS. 12-14 above describe examples of how the user can select the site(s) to which the object and location are transmitted for publication. The discussion relating to these Figures also introduces the concept that the described devices/systems/architectures can be used in a reverse manner (i.e., reverse publication).

Architecture 1400 shows examples of mapping tools that can assist user(s) 1402 and publisher(s) 1404 to achieve the described functions. The reader is reminded that a user 1402 can also be a publisher 1404 and a publisher can also be a user. In this discussion, a user is someone who captures objects via computing device 104(1)-104(n) and a publisher is someone that hosts a site 108(1)-108(n) that can publish the captured objects based upon associated location information.

Individual computing devices 104(1)-104(n) can include or be associated with a mapping tool 1406(1)-1406(n) respectively. Similarly, individual sites 108(1)-108(n) can include or be associated with a mapping tool 1408(1)-1408(n) respectively. Still another mapping tool 1410 may be thought of as being independent of the computing devices and sites. The various mapping tools 1406-1410 can communicate via network 106. Further, the various mapping tools do not necessarily offer identical functionalities as should become apparent below. Instead, the term mapping tool is used to convey that the tool in some way can contribute to the overall process of capturing objects, associating location information with the captured objects, transmitting the captured objects for publication on a map based upon the location information, and/or establishing relationships for accomplishing the above capturing, associating, and transmitting.

In one configuration the user of an individual computing device 104(1) can utilize mapping tool 1406(1) to directly establish a relationship with an individual site 108(1) via its mapping tool 1408(1). For instance, the user 1402 and the publisher 1404 can negotiate various conditions relating to the user publishing to the site. For instance, the conditions can relate to fees, passwords, illicit content, file size, file format, exclusivity, and ownership, among others. Once the conditions are agreed upon, objects captured by the user's computing device 104(1) can be transmitted and published on a map supported by the site 108(1).

In another configuration, mapping tool 1410 can provide what can be termed an intermediary service between the user(s) 1402 and the publisher(s) 1404. So, for instance, mapping tool 1410 can identify potential publishers that are interested in publishing user content on a map on their site. The mapping tool can even provide one or more maps to the publisher and/or perform some, or all, of the map hosting function on behalf of the publisher. Further, the mapping tool can generate selectable icons that appear on the map and correspond to individual objects.

In a similar manner, mapping tool 1410 may identify users who are interested in publishing objects to a site's map(s). Mapping tool 1410 can set up accounts for the publishers and users with associated conditions. Accordingly, mapping tool 1410 can identify matches between users and publishers to facilitate publishing of captured images. For instance, mapping tool 1410 can indicate to a user that an individual publisher is willing to allow the user to publish on their site as long as the objects are in jpeg or pdf format and that the user allows the publisher to monitor his/her location via the user's computing device.

Similarly, mapping tool 1410 can provide a user 1402 with a list of publishers 1404 that are willing to publish according to the conditions established by the user. Mapping tool 1410 can also rank or present sites 108 to the user based upon geographic location, subject matter, etc. For instance, if the user wants to take pictures at sporting events, the user may be interested in publishing to the local newspaper's site as well as Sports Illustrated and not to The Wall Street Journal.

In this latter configuration, users 1402 and publishers 1404 can interact with mapping tool 1410 without having to directly interact with one another. This configuration can be easier for both user 1402 and publishers 1404. For instance, the user need only establish a single account via mapping tool 1410 rather than an account with each publisher. Similarly, the publishers can establish one account with mapping tool 1410 and avoid the logistics of dealing with potentially millions of users.

The latter described configuration further lends itself to reverse publication concepts. For instance, publisher 1404 can specify that they want to send content to users 1402 (i.e., to the user's computing device 104) based upon the user's location, such as by continent, country, state, county, city, specific coordinates etc. Mapping tool 1410 can track users' locations and send the appropriate content to individual user's based on location data maintained by the mapping tool. Further, the user account information maintained by mapping tool 1410 can offer other parameters that can be used for filtering content. For instance, an Oregon newspaper that has a publishing agreement with mapping tool 1410 can obtain content about wineries in the Willamette Valley. The newspaper could specify that they want the story sent to all user's that are located in Northwest Oregon and Southwest Washington who have identified wine as an interest in their account information.

The present implementations can enable still other mapping variations. For instance, mapping tool 1410 can allow publishers to link RSS feeds to the publishers map. For instance, say the publisher posts an RSS feed story about Iraq on their site. The mapping tool can link the story to the publisher's map so that a reader can click on the link and see a map of Iraq when reading the story. In another configuration the mapping tool can enable location based headlines. For instance, say the publisher receives RSS feeds for headline stories. The mapping tool can tie the stories to the publisher's map by location. So if a user wants to view the headlines from Asia they simply go Asia on the map to view the headlines, icons or some other representation of the germane stories.

Exemplary Methods

FIG. 15 illustrates a flowchart of a method or technique 1500 that is consistent with at least some implementations of the present concepts. The order in which the technique 1500 is described is not intended to be construed as a limitation, and any number of the described blocks can be combined in any order to implement the technique, or an alternate technique. Furthermore, the technique can be implemented in any suitable hardware, software, firmware, or combination thereof such that a computing device can implement the technique. In one case, the technique is stored on a computer-readable storage media as a set of instructions such that execution by a computing device causes the computing device to perform the technique.

The method obtains a captured object and location information associated with the capture at block 1502. For instance, a user may enter text, take a picture, etc. on a computing device. Location information relating to where the object was captured can then be associated with the captured object.

The method sends the captured object and location information to a predefined site (i.e., web-site) for publishing on a digital map based upon the location information at 1504. The user can predefine the web-site before completion of either of blocks 1502 and 1504 or after completion of block 1502, but before block 1504. For instance, the user may predefine a default condition that specifies one or more web-sites. The default condition can further indicate that whenever the user captures an object that the object should automatically be transmitted to the defined web-site(s). In another instance, the user may capture an object, such as a picture. A user interface can then allow the user to predefine what web-sites before the transmitting. For instance, the user may go to a football game with his/her family and take a picture of the family. The user can predefine his/her own map as the web-site before transmitting the picture. The user may also take a picture of the action in the game and predefine transmitting that picture to a map published by Sports Illustrated. In still other configurations, the user may not predefine any sites and the method may attempt to identify potential publishers based upon available data, such as the location data associated with the picture.

FIG. 16 illustrates a flowchart of a method or technique 1600 that is consistent with at least some implementations of the present concepts. The order in which the technique 1600 is described is not intended to be construed as a limitation, and any number of the described blocks can be combined in any order to implement the technique, or an alternate technique. Furthermore, the technique can be implemented in any suitable hardware, software, firmware, or combination thereof such that a computing device can implement the technique. In one case, the technique is stored on a computer-readable storage media as a set of instructions such that execution by a computing device causes the computing device to perform the technique.

Block 1602 determines a geographical location of a mobile device. Examples for determining the location are described above in relation to FIG. 1.

Block 1604 identifies an object affiliated with the geographical location. For instance, a user may be traveling with a mobile device in the form of computing device 104 described above. Say for instance, that the user and the computing device are in Astoria, Oreg. Assume further that the user has a subscription/publisher agreement with the Oregon Tourism Office that also authorizes reverse publication. The Oregon Tourism Office, upon determining that the user is in Astoria, can affiliate an article about the Astoria Lewis and Clark Museum with the user's location.

Block 1606 transmits the object to the mobile device. This reverse publication model can be advantageous to both the user/subscriber and the publisher. For instance, the user receives objects that are specifically affiliated with the user's location or projected location and the publisher gets to send out material that may increase the publishers overall viewers/readers. The subscription/publisher agreement can be configured to foster the overall benefit to the parties. For instance, the user can specify conditions, such as areas of interest. For instance, the user may specify that he/she is only interested in receiving material related to "food and wine". This feature potentially increases the satisfaction of the user and lets the subscriber target the content to the reader both by location and interest. Another condition that can be agreed upon is whether the publisher can send content material and advertising material or just content material.

FIG. 17 illustrates a flowchart of a method or technique 1700 that is consistent with at least some implementations of the present concepts. The order in which the technique 1700 is described is not intended to be construed as a limitation, and any number of the described blocks can be combined in any order to implement the technique, or an alternate technique. Furthermore, the technique can be implemented in any suitable hardware, software, firmware, or combination thereof such that a computing device can implement the technique. In one case, the technique is stored on a computer-readable storage media as a set of instructions such that execution by a computing device causes the computing device to perform the technique.

The method receives a data package at block 1702. The data package can include an object and location information relating to where the object was captured. The data package can also contain annotations or notes from the user, time of capture information, and information about the user, among others.

The method publishes the object of the data package on a digital map based upon the location data contained in the digital package at block 1704. This configuration can allow others to access objects based upon the location of the object on the map. For instance, if the user wants to see pictures of the Cascade Mountains, the user simply looks for content superimposed over the Cascade Mountains on the map. If the user then decides that he/she wants to see pictures of Mount Rainier, the user simply focuses in proximity to Mount Rainier on the map. The presence of any pictures in this area can be conveyed to the user for his/her viewing.

FIG. 18 illustrates a flowchart of a method or technique 1800 that is consistent with at least some implementations of the present concepts. The order in which the technique 1800 is described is not intended to be construed as a limitation, and any number of the described blocks can be combined in any order to implement the technique, or an alternate technique. Furthermore, the technique can be implemented in any suitable hardware, software, firmware, or combination thereof such that a computing device can implement the technique. In one case, the technique is stored on a computer-readable storage media as a set of instructions such that execution by a computing device causes the computing device to perform the technique.

Block 1802 interacts with a user to allow the user to publish an object captured by the user to a digital map. For instance, the interaction can involve identifying for the user web-sites (i.e., sites) that are capable of publishing objects based upon associated location information. For example, a list of potential publishers can be provided to the user. In some instances, the interaction can involve, providing conditions that specific web-sites require for users to publish to their site. In other cases, the interaction can involve establishing a user account for the user that includes information about the user. In some implementations, the list of potential subscribers mentioned above may also list associated requirements (if any) for the individual listed publishers. For example, the interaction may provide a list of four public sites which may be suitable for the user based upon various conditions. Such conditions can include the user's location and/or other conditions that may, for example be defined in the user's account.

In some cases, the conditions may be utilized to present the potential publishers to the user in a ranked manner. For instance, the list may indicate that the user presently meets the requirements to publish to the first listed site, but additional material would have to be submitted to publish to the second two. The list could also present other information, such as whether a potential publisher screens submissions or publishes all submissions.

In a majority of instances, a user can be thought of as a specific individual, however, such need not be the case. For instance, a user can be an entity, such as a business entity or a group of individuals. For example, a photography studio may desire to get more public exposure for its nature photographs. The photography studio can set up a user account that can be utilized by any of its photographers.

Block 1804 communicates with a publisher to allow the publisher to receive the object for publication on the digital map according to location information associated with the object. The communications may involve for example, details about the publisher's site, condition associated with publishing to the site, the types of content that the site is interested in and/or the types of users that the site is interested in attracting, etc. The interacting and communicating can provide great time and resource saving to one or both of the users and the publishers. For instance, users don't have to hunt for places to publish their objects or negotiate with multiple publishers. Similarly, publishers can be paired with users who share the publisher's goals and thereby increase the quality of content available on the publisher's site. Accordingly, with very little effort the publisher can get more content, relevant content, and more viewers of their content. Similarly, user's get increased opportunity to publish their content with reduced effort.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Furthermore, each action and/or process discussed throughout can be implemented in hardware, software, or a combination thereof. In the context of software, the actions and/or processes may be implemented via computer-executable instructions that, when executed by one or more processors, perform the recited operations. Generally, computer-executable instructions include routines, programs, objects, components, data structures, and the like that perform particular functions or implement particular abstract data types. The order in which the operations have been discussed is not intended to be construed as a limitation, and any number of the described operations can be combined in any order and/or in parallel to implement any of the described processes.

The invention claimed is:

1. One or more non-transitory computer-readable storage media storing computer-executable instructions that, when executed on one or more processors, direct a mobile device to perform operations that record a subject of interest and a location on a map where the subject of interest was recorded for publication in a map overlay, the operations comprising:
  continually tracking a series of locations of the mobile device as the mobile device travels through the tracked locations; and
  while the mobile device is at a particular location of the tracked locations:
    capturing with the mobile device, the subject of interest and location data that corresponds to the particular location, wherein capturing the subject of interest includes at least one of:
      using a camera functionality of the mobile device to capture a photograph;
      using a video camera functionality of the mobile device to capture a video;
      using the mobile device to save a document;
      using the mobile device to save text;
      using the mobile device to capture audio;
      using the mobile device to save a media file;

using the mobile device to save an email; or
using the mobile device to save a text message;
allowing a user to create additional descriptive content associated with the subject of interest; and
transmitting the captured subject of interest, the additional descriptive content, and the location data from the mobile device to a site that publishes the captured subject of interest and the additional descriptive content to a digital map at a position on the digital map that is based on the particular location.

2. The non-transitory computer-readable storage media of claim 1, wherein the tracked locations comprise locations provided by a global positioning system (GPS) application.

3. The non-transitory computer-readable storage media of claim 1, the operations further comprising presenting a user-interface via the mobile device from which a user can select from multiple sites that can host the digital map.

4. The non-transitory computer-readable storage media of claim 1, wherein the capturing, allowing, and transmitting are performed in real-time.

5. One or more non-transitory computer-readable storage media storing computer-executable instructions that, when executed on one or more processors, direct a computing device to perform operations that document a subject of interest and a location where the subject of interest was documented, to enable publishing of the subject of interest to a map overlay, the operations comprising:
obtaining data documenting a subject of interest that was captured by a mobile device and location information identifying one or more locations where the subject of interest was documented by the mobile device;
receiving additional descriptive content describing the subject of interest; and,
sending the data documenting the subject of interest, the additional descriptive content, and the location information to a web-site that publishes the data documenting the subject of interest and the additional descriptive content on a digital map at a position on the digital map that is based upon the location information.

6. The non-transitory computer-readable storage media of claim 5, the operations further comprising allowing a user that documented the subject of interest to pre-define the web-site.

7. The non-transitory computer-readable storage media of claim 5, the operations further comprising automatically selecting the web-site.

8. The non-transitory computer-readable storage media of claim 5, the operations further comprising presenting a list of potential web-sites to a user that documented the subject of interest and allowing the user to select the web-site from the list.

9. The non-transitory computer-readable storage media of claim 5, the operations further comprising identifying the web-site from an account that relates to a user that documented the subject of interest.

10. The non-transitory computer-readable storage media of claim 5, wherein the web-site is predefined before the obtaining.

11. The non-transitory computer-readable storage media of claim 5, wherein the web-site is predefined after the obtaining and before the sending.

* * * * *